March 3, 1970

R. E. CAVANAUGH, JR 3,499,149

EXTERNAL STANDARDIZATION IN LIQUID SCINTILLATION SPECTROMETRY
MAKING USE OF MULTIPLE EXTERNAL STANDARDS
TO INSURE VOLUME INDEPENDENCE

Filed April 11, 1966

INVENTOR.
ROBERT E. CAVANAUGH, JR.
BY
Wolfe, Hubbard, Voit & O'sann
ATTORNEYS.

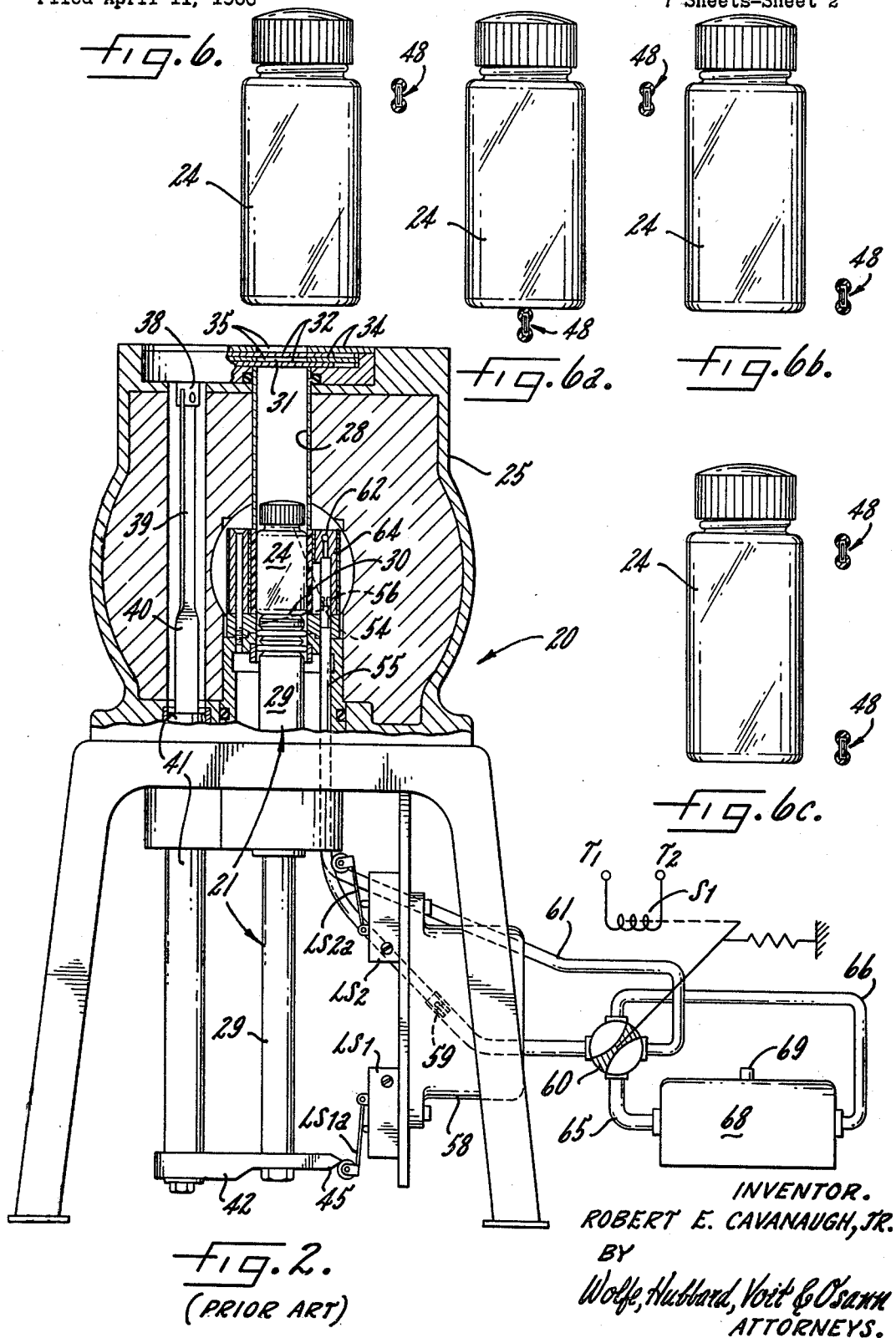

March 3, 1970 R. E. CAVANAUGH, JR 3,499,149
EXTERNAL STANDARDIZATION IN LIQUID SCINTILLATION SPECTROMETRY
MAKING USE OF MULTIPLE EXTERNAL STANDARDS
TO INSURE VOLUME INDEPENDENCE
Filed April 11, 1966 7 Sheets-Sheet 3
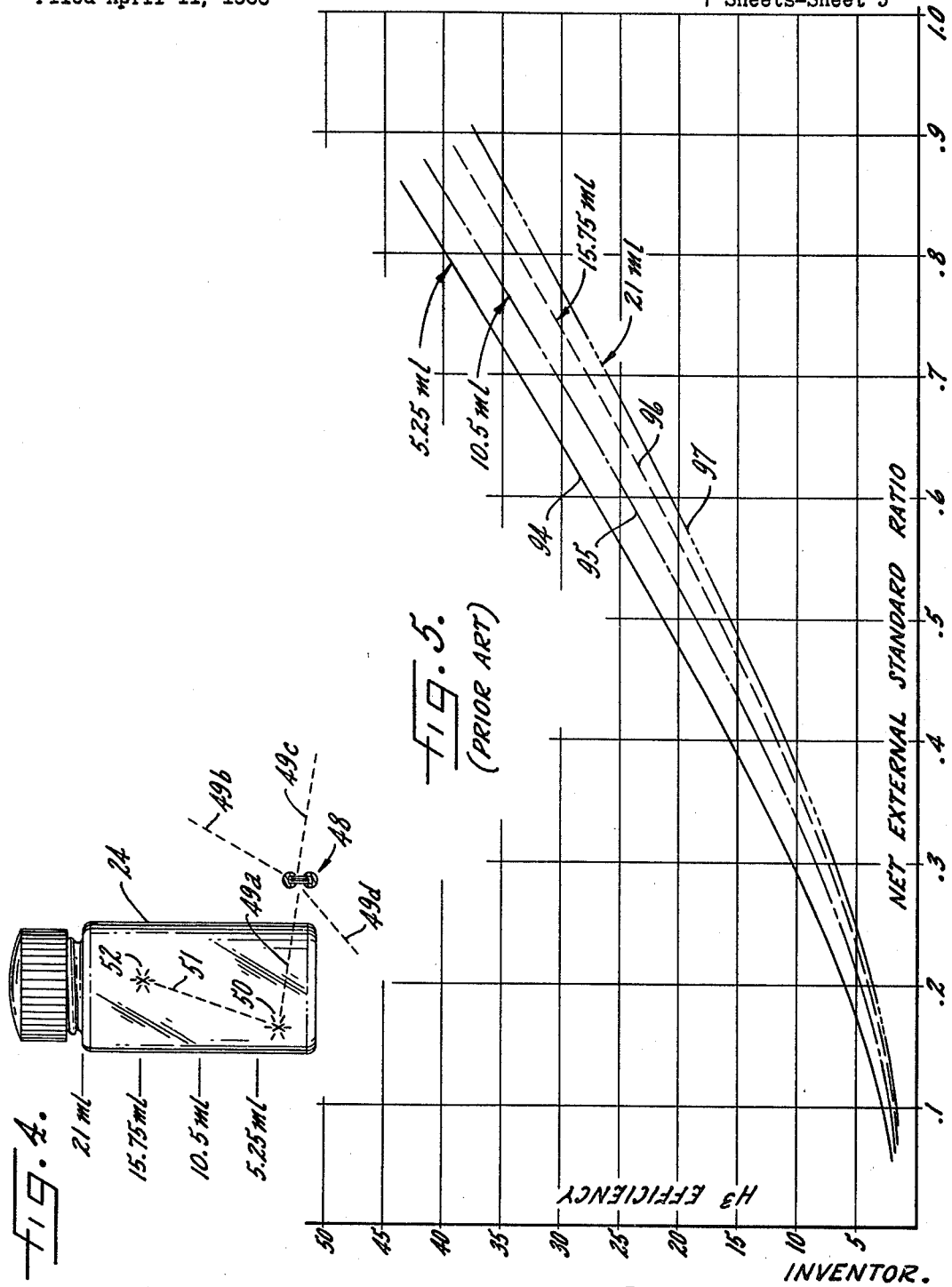
INVENTOR.
ROBERT E. CAVANAUGH, JR.
BY
Wolfe, Hubbard, Voit & Osann
ATTORNEYS.

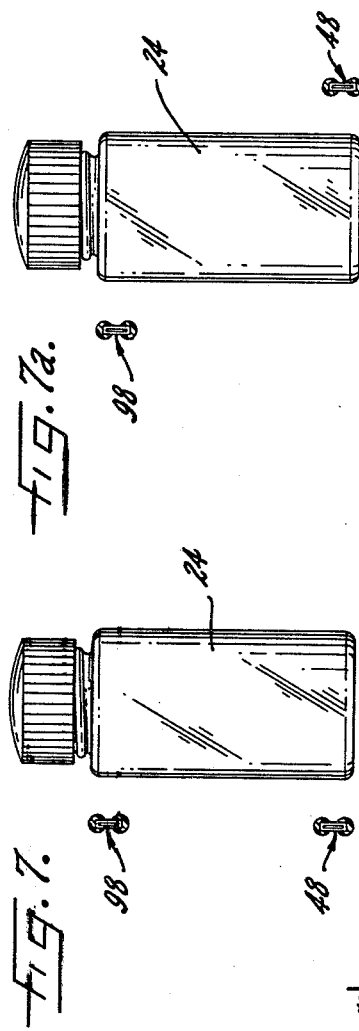
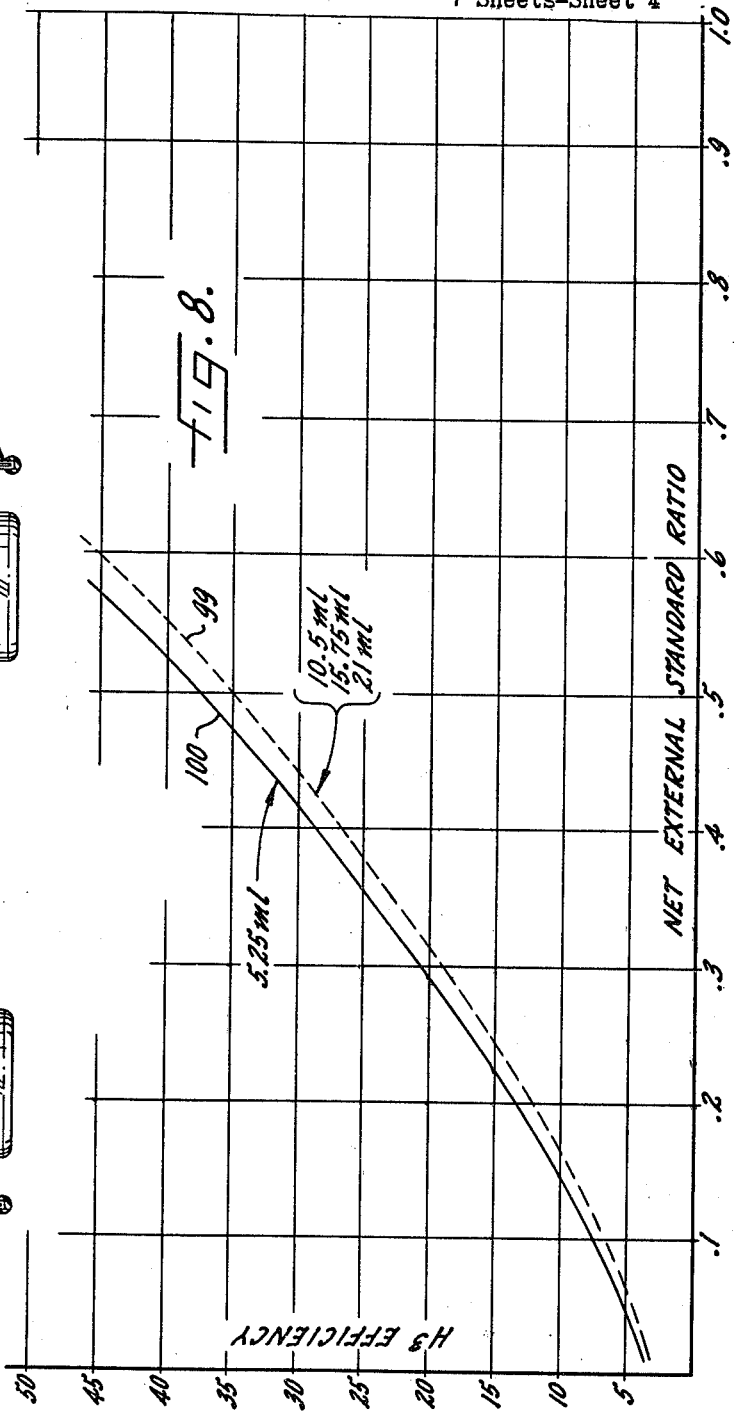

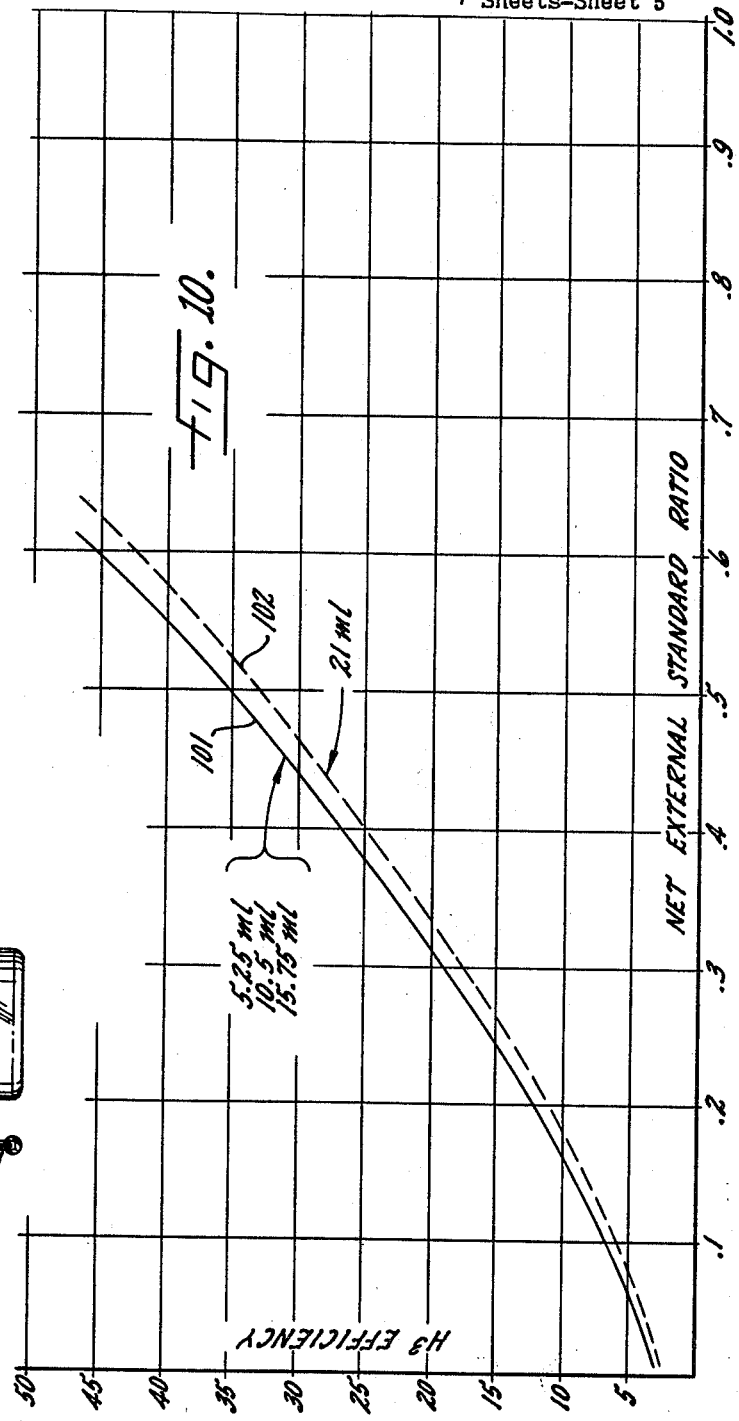
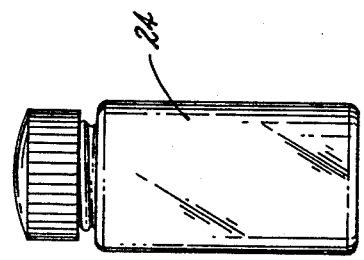

March 3, 1970  R. E. CAVANAUGH, JR  3,499,149
EXTERNAL STANDARDIZATION IN LIQUID SCINTILLATION SPECTROMETRY
MAKING USE OF MULTIPLE EXTERNAL STANDARDS
TO INSURE VOLUME INDEPENDENCE Filed April 11, 1966

INVENTOR.
ROBERT E. CAVANAUGH, JR.
BY
Wolfe, Hubbard, Voit & O'sann
ATTORNEYS.

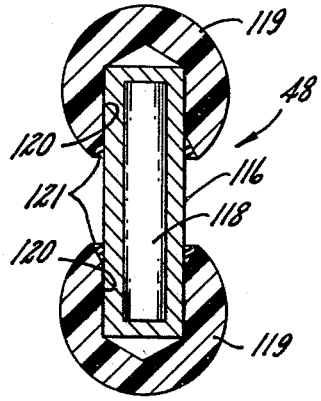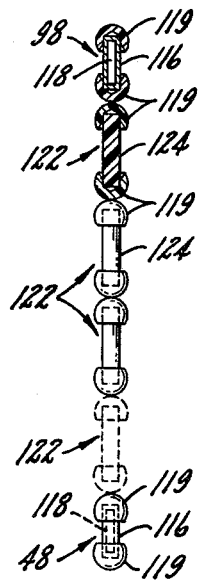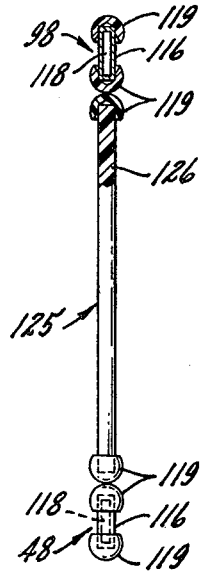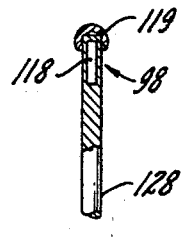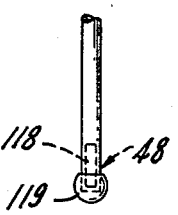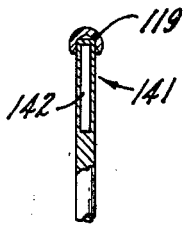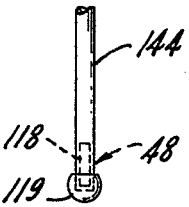

United States Patent Office 3,499,149
Patented Mar. 3, 1970

3,499,149
STANDARDIZATION IN LIQUID SCINTILLATION
SPECTROMETRY MAKING USE OF MULTIPLE
EXTERNAL STANDARDS TO INSURE VOLUME
INDEPENDENCE
Robert E. Cavanaugh, Jr., La Grange Park, Ill., assignor
to Packard Instrument Company, Inc., Downers Grove,
Ill., a corporation of Illinois
Filed Apr. 11, 1966, Ser. No. 541,721
Int. Cl. G01t 1/20; H01j 39/18; G21h 5/00
U.S. Cl. 250—71.5                                      34 Claims

ABSTRACT OF THE DISCLOSURE

A method for improving spectral analysis techniques in liquid scintillation counting procedures and for correctively compensating for quenching and similar phenomena with a high degree of accuracy and reliability, yet wherein errors resulting from differing sample volumes are substantially eliminated. More specifically, a method of the foregoing character wherein two or more external standards are positioned adjacent each sample during a portion only of its counting cycle; one of the standards being an emitter of penetrating radiations having both relatively high and relatively low energies, and the other of the standards being an emitter of penetrating radiations having relatively low energies only; whereby the emitter of penetrating radiations having relatively low energies only serves to produce an increasingly greater number of low energy light scintillations in test samples with increases in liquid volume therein so as to maintain the ratio of low energy and high energy. "Compton interactions" substantially constant irrespective of sample volume.

Background of the invention

The present invention relates in general to liquid scintillation spectral analysis of test samples containing one or more radioactive isotopes disposed in a liquid scintillator and, more particularly, to improved spectral analysis techniques and equipment which permit of corrective compensation for the effects of quenching and other phenomena such as instrument drift, line voltage drift, or temperature change, all of which tend to change counting efficiency. In its principal aspects, the invention is concerned with improved methods and equipment for exposing one or more radioactive test samples (either prior to or subsequent to measurement of the energy spectrum of the isotope contained therein) to a known quantity per unit time of radiant energy emanating from standard source material characterized by its ability to produce in the liquid scintillator an observable spectrum of light energy typical of, for example, a beta emitter, yet wherein the counting efficiencies of the isotope contained therein and the correlation of the standard is substantially independent of the volume of liquid contained within the sample vials.

In liquid scintillation counting procedures various techniques have heretofore been employed for compensating for the adverse effects created by, for example, quenching, instrument drift, and/or line voltage drift. Representative ones of such techniques have been disclosed and described in detail in Lyle E. Packard U.S. Patent No. 3,188,468 issued June 8, 1965 and assigned to the assignee of the present invention. Various forms of procedures and apparatus are described and claimed in the aforesaid Packard patent for automatically subjecting such samples to two separate counting cycles, during one of which the sample being counted is exposed to a known quantity per unit time of radiant energy emanating from either an internal or an external standard. From the data recorded during these two separate counting periods, it is then possible, as set forth in the aforesaid Packard patent, to determine the true activity levels of the isotope or isotopes, either by performing arithmetical computations or, as is the more conventional practice when dealing with external standards, by comparing the observed counts with previously prepared sets of calibration curves. However, in the latter instance it has been found that the volume of liquid contained in the sample is a factor that does effect the accuracy of the computations and, therefore, it has been necessary to prepare in advance a set of calibration curves for each different sample volume that may be encountered, as well as for each isotope that may be of interest. Since the volume of liquid sample that may be encountered can, and often does, vary over a wide range—for example over a range from a few milliliters to perhaps on the order of 21 milliliters—it has heretofore been necessary to prepare numerous calibration curves for each isotope that may be of interest. Then, in order that the curves may be properly used it is necessary for the technician to either ascertain or control the volume of each sample that is undergoing analysis. The foregoing procedures, while accurate when properly carried out, are inordinately time consuming and tedious. Moreover, the chances of technician error diminishing the accuracy of the results of the sample analysis are relatively high.

It is a general aim of the present invention to provide improved external standardization procedures and equipment suitable for use in liquid scintillation counting systems which overcome the foregoing disadvantages and wherein the effect of sample volume is either eliminated or substantially minimized. Stated another way, it is a general object of the present invention to provide improved external standardization procedures and equipment wherein the data recorded incident to an external standardization counting cycle is substantially independent of the volume of liquid contained within the sample undergoing test.

A more specific object of the invention is the provision of improved procedures and equipment for compensating for the effect of changes in sample volume from sample to sample so that successive samples having diverse volumes may be analyzed rapidly and accurately, yet wherein the technician does not have to prepare separate calibration curves in advance for each different sample volume that may be encountered and wherein the technician does not need to either control or measure the volume of liquid contained in given sample vials in order to achieve results comparable to those heretofore achieved by the more tedious and time consuming procedures heretofore described. Moreover, because of attainment of this objective, the problems resulting from technician error are significantly minimized.

A related object of the invention is to provide improved procedures and equipment suitable for use in external standardization counting techniques, whether automatic or otherwise, yet which are characterized by their simplicity and reliability in operation and which may be readily practiced with and incorporated in liquid scintillation counting systems presently in commercial use.

Other objects and advantages of the invention will become apparent as the following description proceeds, taken in conjunction with the accompanying drawings, in which:

FIG. 2 is a side elevation, partly in section and partly in diagrammatic form, here showing a conventional apparatus for selectively positioning a single recirculatory pellet of standard radioactive source material adjacent a sample disposed in the detection chamber for purposes of permitting a standardization counting cycle for the sample;

FIG. 4 is a side elevational view of an exemplary sample vial of the type commonly employed in liquid scintillation counting systems, here depicting in diagrammatic from the creation of light scintillations as a result of "Compton interactions" occurring as a result of the emission of highly penetrating radiation from an external source disposed adjacent the lower edge of the sample vial;

Figure 1:
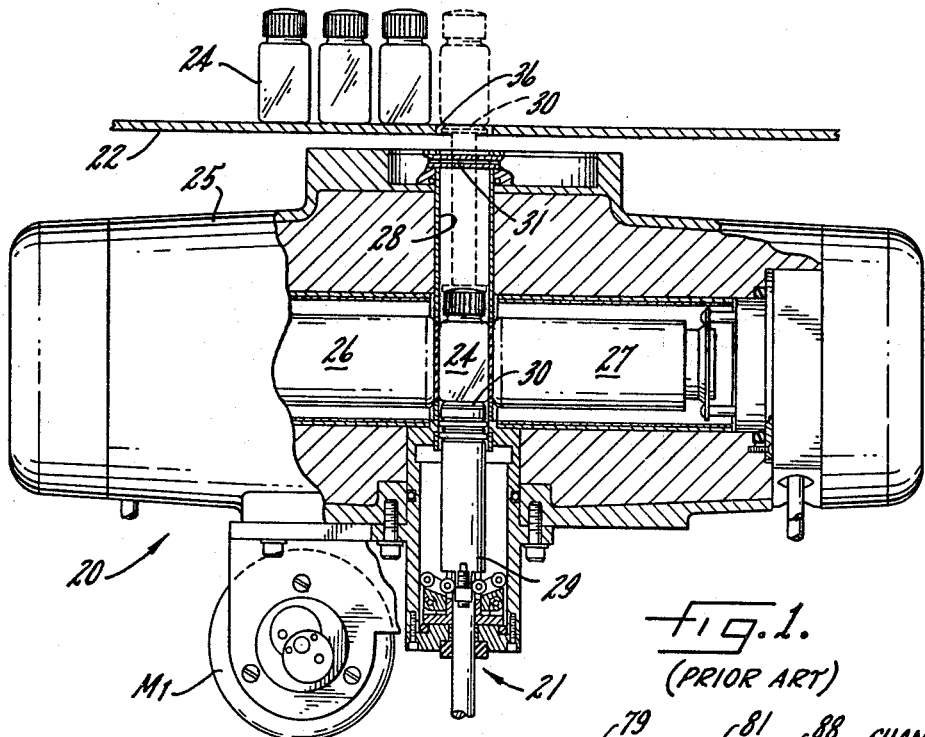
FIG. 1 is a fragmentary side elevational view, partly in section, depicting an exemplary radiation detection chamber and elevator mechanism suitable for processing samples in accordance with the present invention, the apparatus here being depicted with the elevator mechanism in the down or "sample loaded" position with the sample to be analyzed interposed between a pair of light transducers.
Figure 11:
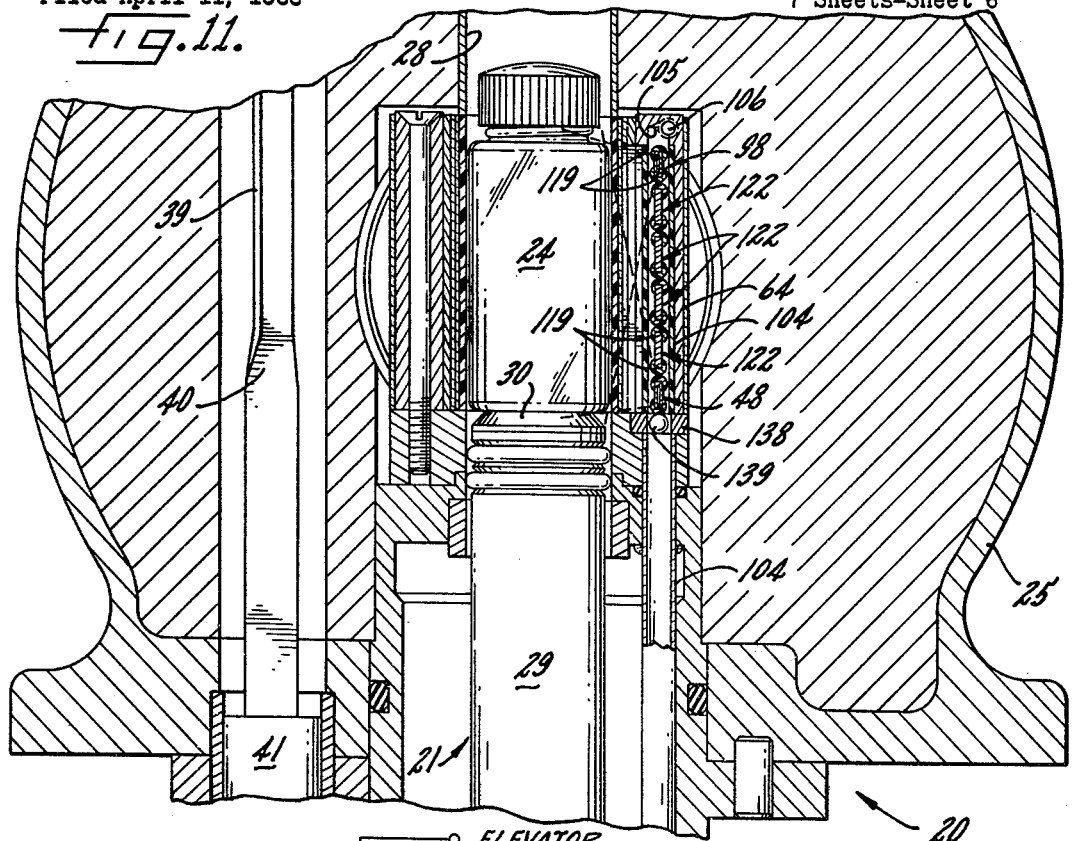
Figure 12:
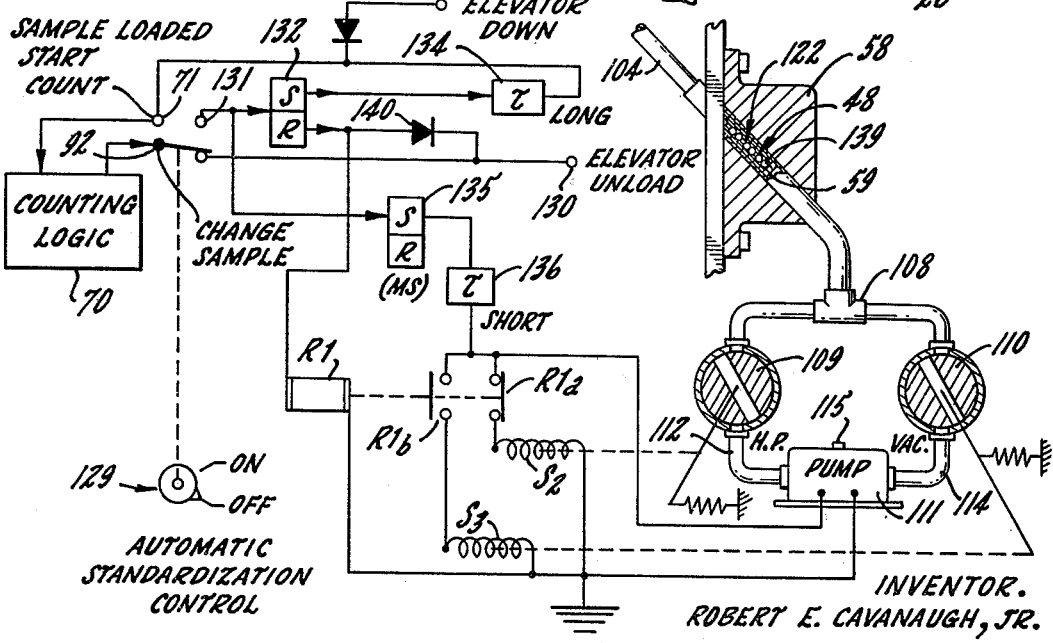

FIG. 5 is a graphic representation of a typical set of calibration curves which are commonly used for determining the counting efficiency of a liquid scintillation counting system, the calibration curves here illustrating the counting efficiency of such a system when analyzing test samples containing different sample volumes and a beta emitting isotope, in this case tritium, the curves here being applicable to standardization counting techniques wherein an external standard is positioned relative to the sample vial as shown in FIG. 4;

FIGS. 6 and 6A are side elevational views of sample vials similar to the view depicted in FIG. 4, but here each showing a single external pellet of standard radioactive source material positioned adjacent the vial at a slightly different position relative thereto than that illustrated in FIG. 4;

FIGS. 6B and 6C are side elevational views of sample vials similar to the views of FIGS. 4 and 6, but here each depicting two external pellets of standard radioactive source material positioned adjacent the vials, one pellet being positioned adjacent the top and one adjacent the bottom of each vial with both pellets associated with each vial being of the same isotope or isotopes having closely similar energy emissions;

FIGS. 7 and 7A are side elevational views of sample vials similar to the views of FIGS. 6C and 6B respectively, but here each depicting two external pellets of standard radioactive source material positioned adjacent the vial, one pellet being positioned adjacent the top and one adjacent the bottom of each vial with the upper most pellet associated with each vial comprising standard radioactive source material having relatively low energy emissions when compared with the energy of emissions of the pellet adjacent the bottom of the associated vial, all in accordance with the teachings of the present invention;

FIG. 8 is a graphic representation of a typical set of calibration curves similar to those shown in FIG. 5, but which are here used in the practice of the present invention for determining the counting efficiency of a liquid scintillation counting system by means of external standardization counting techniques wherein at least two external standards having different energy emissions are positioned adjacent the sample vials in the manner shown by way of example in FIGS. 7 and 7A;

FIG. 9 is a side elevational view of a sample vial which is here similar to the view shown in FIG. 7, but in which the uppermost pellet comprising the lower energy source is positioned adjacent the midpoint of the vial rather than adjacent its uppermost edge;

FIG. 10 is a graphic representation of a typical set of calibration curves similar to those shown in FIG. 8, but which are here used in the practice of the present invention for determining the counting efficiency of a liquid scintillation counting system by means of external standardization counting techniques wherein the two external standards are positioned relative to the sample vial in the manner shown by way of example in FIG. 9;

FIG. 11 is an enlarged fragmentary vertical sectional view similar to the upper portion of FIG. 2, but here depicting a slightly modified apparatus for selectively positioning two or more external standards having different energy emissions adjacent a sample vial disposed in the counting chamber in accordance with the present invention;

FIG. 12 is a fragmentary schematic wiring diagram of the control components utilized for positioning two or more pellets of standard radioactive source material, each having different energy emissions, in accordance with the form of the invention shown in FIG. 11;

FIG. 13 is an enlarged sectional view depicting a single pellet of standard radioactive source material and of the type which has heretofore been used in conducting external standardization counting operations;

FIG. 14 is a side elevational view, partly in section, here depicting one form of the invention for maintaining two separate sources of standard radioactive source material at a fixed, yet adjustable, distance from one another; and FIGS. 15, 16 and 16A are side elevational views, partly in section, similar to FIG. 14, but here depicting slightly modified constructions for maintaining two or more different energy sources in spaced apart relation in accordance with the present invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

General organizations of an exemplary sample processing apparatus

Referring now to FIGS. 1 and 2 conjointly, there is illustrated an exemplary automatic sample processing apparatus, generally indicated at 20, which is intended to transfer a plurality of samples one at a time in seriatim order to and from a detection station. To this end, the exemplary apparatus 20 includes an elevator and a detector mechanism, generally indicated at 21, which is positioned beneath a support table 22 (FIG. 1) on which one or more sample vials 24 are positioned both prior to and subsequent to transfer to a counting station. As the ensuing description proceeds, those skilled in the art will appreciate that the particular means employed for conveying samples 24 to and from a point of alignment with the elevator mechanism 21 is immaterial to the present invention. Thus, it will be understood that the samples 24 may be carried in rotatable trays in the manner described in greater detail in the aforesaid Packard Patent No. 3,188,468. Alternatively, a plurality of successive sample vials may be conveyed to a point of alignment with the elevator 21 by means of an endless conveyor having separate supports for the various vials. And, of course, it will be understood that successive sample vials may be manually placed on and removed from the elevator apparatus 21. Moreover, while there has herein been illustrated and will be described a power driven elevator mechanism 21 for conveying successive samples 24 into and out of a counting chamber, the elevator need not be automatic and could take the form of a manually operated elevator of the type illustrated in one of the forms of the invention disclosed and claimed in Robert E. Olson U.S. Patent No. 3,198,948, a patent assigned to the assignee of the present invention. Indeed, the present invention will also find advantageous use in more rudimentary forms of radiation detection devices which are completely manual in operation and which do not employ any type of elevator, the samples being manually positioned within and removed from the counting chamber.

However, to facilitate an understanding of the present invention, the general organization and operation of the elevator and detector mechanism 21 will be briefly described herein below. Those interested in a more complete operational and structural description of the mechanism 21 are referred to aforesaid Packard and Olson patents.

Referring to FIG. 1, it will be noted that the elevator and detector mechanism 21 includes a base assembly 25 which houses a pair of light transducers, for example, photomultipliers 26, 27 disposed on opposite sides of a vertical elevator shaft 28. Mounted within the elevator shaft 28 is an elevator 29 having a platform 30 at its upper end for supporting one of the radioactive test samples 24 and transporting the sample downwardly into the elevator shaft where it is aligned between the photomultipliers 26, 27. Each sample 24 may simply comprise a light transmissive vial or other suitable light transmissive container within which is placed a liquid scintillator and a radioactive isotope or isotopes to be measured. Thus, as the isotope or isotopes undergo disintegrations, light scintillations are produced in the liquid scintillator, and such scintillations are then detected by the photomultipliers which produce electrical output signals in the form of voltage pulses corresponding to each light scintillation detected. At the completion of the counting cycle the elevator 29 is returned upwardly so as to eject the sample 24 from the elevator and detector mechanism 21. A shutter mechanism 31 is mounted on the upper end of the base assembly 25 for the purpose of preventing erroneous output signals from the photomultipliers 26, 27 resulting from environmental light. At the same time, the base assembly 25 is formed of suitable shielding material such, for example, as lead, which serves to minimize the amount of environmental ionizing radiation causing light flashes in either the scintillation medium or the photomultipliers.

Figure 3:
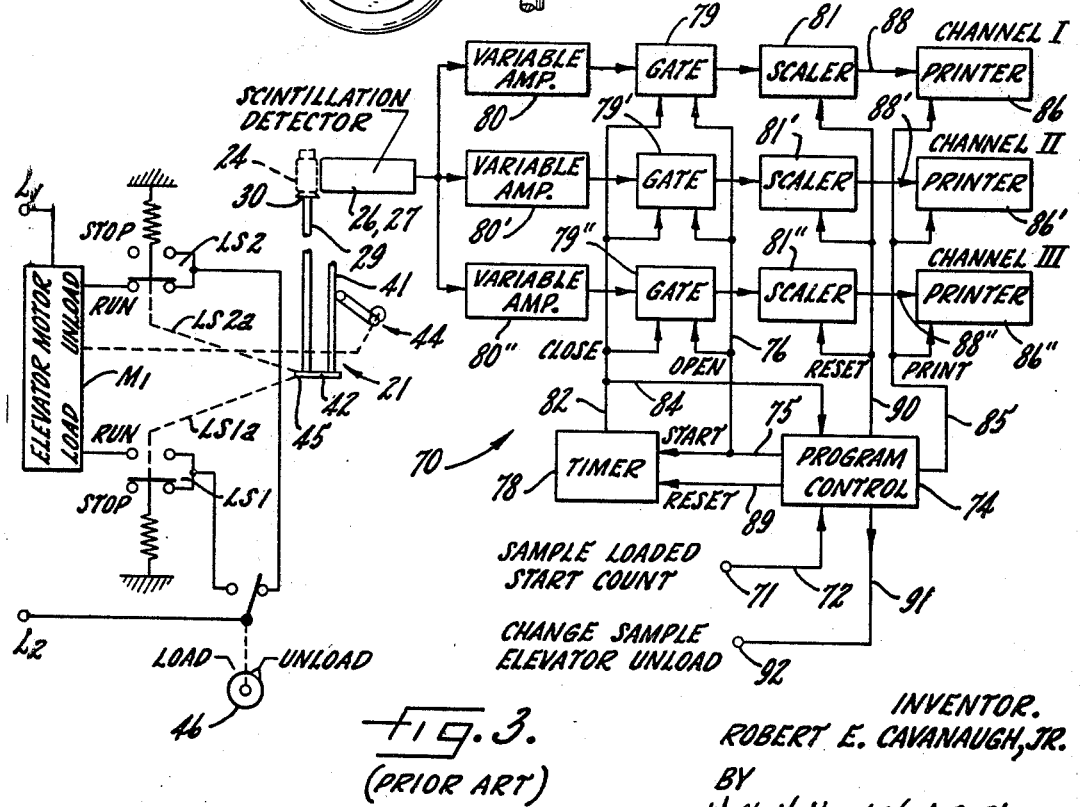
FIG. 3 is a schematic wiring diagram, partly in block form, here depicting a conventional control system for operating the elevator mechanism shown in FIGS. 1 and 2 and a conventional electrical system which accepts, counts and records the output of the radiation detector.

In order to ensure that the shutter mechanism 31 is opened and closed in timed relationship with vertical movement of the elevator 29, the two devices are interconnected and actuated by a common reversible drive motor M1 (FIGS. 1 and 3). Referring to FIG. 2, it will be observed that the shutter mechanism 31 comprises a plurality of movable shutter blades 32 which are interleaved with a plurality of fixed shutter blades 34, latter having apertures 35 therein aligned with the elevator shaft 28 and with an aperture 36 formed in the table-like support 22. The arrangement is such that when the movable blades 32 are pivoted about a pivot point, they swing between limit positions to selectively open and close the upper end of the elevator shaft 28.

To effect such pivotal blade movement, the movable shutter blades 32 are rigidly secured to a stub shaft 38 in a manner more fully described in the aforesaid Olson patent. Suffice it to say that the stub shaft 38 is rigidly secured to the upper end of a generally flat, depending shutter actuating shaft 39 having a twisted portion 40 intermediate its ends. The lower end of the actuating shaft is received within a tubular drive shaft 41, the latter being coupled adjacent its lower end to the elevator 29 by means of a bracket 42. A pair of dowel pins (not shown) or similar cam means extend transversely through the tubular drive shaft 41 in closely spaced surrounding relation to the shutter actuating shaft 40.

The arrangement is such that as the drive shaft 41 starts to move vertically upward, force is transmitted through the bracket 42 and the elevator 29, thus driving the latter upwardly to unload the sample 24. Just prior to the time that the sample 24 reaches the shutter mechanism 31, the dowel pins or similar cam means traverse the twisted portion 40 of the shutter actuating shaft 39, rotating the latter about its own vertical axis and pivoting the movable blades 32 out of the path of vertical movement of the elevator 29. During a sample loading cycle, the dowel pins are similar cam means serve to cam the shutter actuating shaft 39 in the opposite direction immediately after the new sample 24 passes through the aligned apertures 35, 36 in the shutter mechanism 31 and the table 22, thus swinging the movable blades 32 to the closed position as shown in FIG. 2.

To effect vertical movement of the drive shaft 41 and the elevator 29 for the purpose of introducing samples 24 into and ejecting such samples out of the elevator shaft 28, the drive shaft 41 is drivingly coupled to a conventional reversible motor M1 (FIGS. 1 and 3). The particular means employed for coupling the motor to the drive shaft may vary and have not been described in detail. Those interested in a more complete description are referred to the aforesaid Packard and Olson patents. It should suffice for the purpose of an understanding of the present invention to state that the motor M1 is coupled to the drive shaft 41 in the exemplary apparatus by means of cables diagrammatically indicated at 44 in FIG. 3. The arrangement is such that when the motor M1 is driven in one direction, the cables 44 are payed in and out so as to raise the elevator mechanism 21. Conversely, when the motor is driven in the opposite direction the cables are payed in and out in the opposite direction, thus lowering the elevator mechanism 21.

The energizing circuit for the Motor M1 includes a lower limit switch LS1 (FIGS. 2 and 3) which is mounted on the frame of the sample handling apparatus 20 in a position to have its actuator $LS1_a$ depressed by a laterally projecting flange 45 mounted on the lower end of the elevator when the latter is in a down position with the sample 24 carried thereon aligned between the photomultipliers 26, 27. Depression of the actuator $LS1_a$ serves to deenergize the motor M1 and the apparatus is then reday for a counting cycle. A second limit switch LS2, included in a second energizing circuit for the motor M1, is mounted on the frame of the apparatus 20 in position to have its actuator $LS2_a$ depressed by the flange 45 when the elevator arrives at its uppermost limit position with the sample 24 carried thereon having been ejected from the elevator shaft 28. Thus, the limit switch LS2 serves to deenergize the motor M1 when the elevator reaches its uppermost limit position.

Referring now to FIGS. 1, 2 and 3 conjointly, a brief description of a typical "sample unload" and "sample load" cycle of operation will be set forth. Assuming that the exemplary elevator mechanism 29 is in its down position and that the sample vial 24 positioned in the detection chamber has undergone a complete counting operation for determining the activity level of the radioactive source therein, the operator is now ready to remove the particular sample 24 from the counting chamber between the photomultipliers 26, 27 and to substitute therefor a new sample 24. To this end, it is merely necessary to turn the mode selector switch 46 (FIG. 3) to the "unload" terminal. When this is done, an energizing circuit will be completed from the terminal L2 of a suitable A-C source (not shown) through the "run" contacts of the upper limit switch LS2, and thence to the "unload" terminal of the elevator motor M1, the motor also being connected to the terminal L1 of the A-C source. Under these conditions the motor M1 will be energized and will start to rotate so as to raise the drive shaft 42 and the elevator 29. As the elevator 29 starts upwardly, the flange 45 which is integral with the bracket 42 will release the actuator $LS1_a$ of the lower limit switch LS1, thus permitting the latter to return to its normal condition with the "run" contacts closed and the "stop" contacts open. As the elevator 29 approaches its upper limit position (the shutter mechanism 31 having been actuated by coaction of the shutter actuating shaft 39 and the drive shaft 41), the flange 45 engages the actuator $LS_a$ of the upper limit switch LS2, thus shifting the latter to open the normally closed "run" contacts and close the normally open "stop" contacts. When this occurs, the elevator motor M1 is deenergized and the sample vial 24 is in the "sample ejected" position. The operator now simply replaces that sample with another sample vial and switches the mode selector switch 46 to the "load" terminal. This serves to complete an energizing circuit for the elevator motor M1 from the A-C terminal L2 to the closed "run" contacts of the lower limit switch LS1 and through the "load" terminal of the elevator motor back to the A-C terminal L1. The motor now runs in the opposite direction to again return the elevator to its lowermost position. At the same time, the shutter mechanism is closed as the drive shaft 41 moves downwardly. When the elevator 29 reaches its lowermost limit position, the cam actuator or flange 45 again engages and depresses the actuator $LS1_a$ of the lower limit switch LS1, thus breaking the "run" contacts and making the "stop" contacts thereof. The motor M1 is again deenergized and the apparatus is now ready for another "count cycle."

Of course, those skilled in the art will appreciate that while there has herein been described an operating cycle which is controlled by the operator's placement of a mode selector switch 46, in a completely automatic system the mode selector switch would be unnecessary. Rather, such switch could be replaced by control circuitry of the type described in the aforesaid Packard patent, and described in still greater detail in the copending application of Lyle E. Packard, Alfred A. Munn, Roy E. Smith and Edward E. Polic, Ser. No. 273,189, filed Apr. 15, 1963, now Patent No. 3,257,561 and assigned to the assignee of the present invention.

As stated above, the aforesaid Packard Patent No. 3,188,468 discloses and claims various forms of procedures and apparatus for automatically subjecting successive samples to two separate counting cycles, during one of which the sample to be counted is exposed to a known quantity per unit time of radiant energy emanating from either an internal or an external standard. Generally stated, external standardization techniques are based upon a phenomenon known as "Compton Scatter," a phenomenon wherein the interactions that occur between penetrating radiation and electrons that comprise part of the test sample, produce electrons in the liquid scintillator having an energy spectrum similar in shape to that produced by a beta emitter. Referring to FIG. 4, it will be observed that a standard source of penetrating radiation, generally indicated at 48, has been diagrammatically located exteriorly of and in proximity to the lower edge of a test sample 24, which here takes the form of a vial containing a liquid scintillator. As is characteristic of gamma emitters, or emitters of similar penetrating radiation, the source 48 will undergo a plurality of disintegrations in a given period of time, such disintegration resulting in the emission of gamma rays in diverse directions represented by broken lines 49a–49d. As here shown, the gamma radiation 49a has interacted at point 50 with matter within the liquid sample 24, thus causing excitation of electrons and producing a light flash therein. Under some circumstances, the energy of the gamma radiation may be totally absorbed, although more often the energy of the impinging gamma radiation is only partially absorbed. In the latter event, a photon will veer off randomly, in accordance with the principle of conservation of momentum, at a reduced energy (as represented at 51) until a second "Compton interaction" occurs. Since the photon 51 is at a reduced energy, the chances of producing a second "Compton interaction" are increased, and such an interaction is here shown occuring in the liquid scintillator at point 52. Again, when the photon 51 interacts with matter at point 52, the energy of the photon will be either totally or partially absorbed, thus producing electrons and creating an additional light scintillation in the sample 24. The net result of the foregoing is that "Compton interactions" occuring in the sample 24 will produce an energy spectrum which is highly related by physical laws to that produced by a beta emitter. Consequently, if the isotope disposed in the sample 24 happens to have an energy spectrum that is highly related by physical laws to the energy spectrum produced by the "Compton interactions," then it is possible to determine the true activity level of the isotope regardless of the degree of quenching, changes in line voltage, or instrument drift, since the effect of these variables would be the same on both the isotope and the standard. This may be done by either arithmetical computations or by comparison with previously prepared sets of calibration curves.

Turning now to FIG. 2, there has been illustrated an exemplary apparatus for pneumatically shifting an external standard of radioactive source material 54 into and away from proximity to the sample vial 24 disposed in the counting chamber. Those interested in the specific details of this system are referred to the aforesaid Packard U.S. Patent No. 3,188,468. However, in order to facilitate an understanding of the present invention, this prior automatic standard positioning system will be briefly described below.

Referring to FIG. 2, it will be observed that the standard radioactive source or pellet 54 is positioned within a generally vertically extending conduit 55 which terminates at its upper end adjacent the detection chamber within which the sample vial 24 is positioned. An annular stop 56 is formed in the conduit at or slightly above the upper surface of the elevator platform 30 when the elevator 29 is in its down position. The lower end of the conduit 55 projects into a shielded housing 58 which is rigidly secured to the frame of the apparatus 20, there being a second annular stop 59 formed in the lower end of the conduit 55 within the housing 58. As here shown, the lower end of the conduit 55 is coupled directly to a control valve 60. The upper end of the conduit 55 is also coupled to the control valve 60 via conduit 61 and a communicating bore 62, the latter being formed in sidewall 64 positioned adjacent to the counting chamber. The valve is, in turn, coupled through a low pressure line 65 and a high pressure line 66 directly to a conventional fluid pump which may simply take the form of a pneumatic pump 68, the latter having an air inlet 69. In the illustrative apparatus, the control valve is actuated by means of a solenoid S1 having terminals T1, T2.

The arrangement is such that when the solenoid S1 is energized, the conduit 55 is coupled directly to the high pressure line 66 of the pump 68, while the conduit 61 is coupled directly to the low pressure line 65. Under these conditions, the standard source 54, which is confined within the conduit 55, is blown or urged upwardly within the conduit 55 until it engages the annular shoulder 56 adjacent the counting chamber, thus exposing the test sample 24 positioned in the counting chamber to radiations emanating from the standard source. Conversely, when the solenoid is deenergized, the emitter 54 is displaced downwardly since the conduit 55 is now coupled directly to the low pressure line 65 while the conduit 61 is coupled directly to the high pressure line 66. Therefore the source 54 is shifted into engagement with the annular stop 59 positioned within the housing 58. It will be appreciated by those skilled in the art that in a manually controlled system, it would be possible to couple a source of energizing voltage to the terminals T1, T2 simply by means of operating a mode selector switch. However, in the aforesaid Packard Patent No. 3,188,468, control circuitry is described in detail for automatically energizing the solenoid S1 when it is desired to shift a standard source into proximity with the sample vial disposed in the counting chamber, and those interested in the details of such circuitry are referred to that patent.

Programming logic

Since procedures and equipment employing the features of the present invention will normally be used with an associated programming control circuit, a typical programming system, generally indicated at 70 (FIGS. 3 and 12), will be briefly described herein below. To this end, and referring for the moment to FIG. 3, it will be observed that after a sample 24 has been properly positioned between the detector photomultipliers 26, 27, a signal is received on a terminal 71 indicating that the sample is loaded and that the next counting cycle should be started. Those interested in the particular manner in which the signal is produced and directed to the terminal 71 are referred to the aforesaid Packard Patent No. 3,188,468. For the moment, however, it should suffice to indicate that when the sample is loaded, the "stop" contacts of the lower limit switch LS1 are closed and closure of such contacts can be used to provide the necessary control signal at the terminal 71. The signal applied to the terminal 71 is then passed over a line 72 to a program control 74. This signal indicates that a sample is "ready" for measurement. In response to such signal, the program control 74 passes a signal over lines 75, 76 to start operation of a timer 78 and to open gates 79, 79' and 79", the latter being respectively associated with three pulse height analyzing channels—viz., channels I, II and III. During the predetermined time interval measured off by the timer 78, voltage pulses produced by the photomultipliers 26, 27 are simultaneously passed through variable amplifiers 80, 80' and 80" which are respectively positioned in the three pulse height analyzing channels, and thence to respective ones of the gates 79, 79' and 79". Since the gates are now open, pulses are permitted to pass through the gates to respective ones of scalers 81, 81' and 81". Those skilled in the art will appreciate that the gates 79, 79' and 79" comprise suitable discriminator circuits (not shown) which may be selectively adjusted to permit passage of only a selected amplitude band of pulses therethrough. Moreover, the input pulses to the three pulse height analyzing channels may be differentially amplified by means of the variable amplifiers 80, 80' and 80" in a manner described in greater detail in Lyle E. Packard U.S. Patent No. 3,114,-835 assigned to the assignee of the present invention.

At the end of the timed period provided by the timer 78, the latter supplies a signal over lines 82 and 84 to respectively close the gates 79, 79' and 79" and indicate to the program control 74 that counting has been completed. In response to the signal received over line 84, the program control 74 first supplies an actuating signal over a line 85 to printers 86, 86' and 86" respectively associated with the three pulse height analyzing channels. The latter are coupled to respective ones of the scalers 81, 81' and 81" by channels 88, 88' and 88", and thus print out on a paper tape or the like the reading of the scalers 81, 81', and 81". Following such "read out" by the printers 86, 86', 86", the program control 74 supplies signals over lines 89, 90 to reset the timer 78 and the scalers 81, 81' and 81". At this time, the program control 74 also supplies a signal over line 91 to terminal 92 to signify that the sample in the detector should be changed.

Because the system shown diagrammatically in FIG. 3 may take any of a variety of forms known to those skilled in the art, it need not be illustrated or described in greater detail. It will be understood, however, that the "counts" printed out by the printers 86, 86' and 86" will include responses to background radiation which produces scintillation flashes in the liquid scintillator and whch is received from extraneous sources, such background responses being in addition to the responses to radiation from the sample being meaured. However, this "background count" can be first measured with no sample, or a sample of known radioactive strength in the detector. The background count can then be subtracted from each sample reading to arrive at an indication of the sample's radiation strength.

Besides counting the number of responses by the photomultipliers in a predetermined time interval (preset time operation), the time period required for the generation of a predetermined number of responses (preset count operation) may be measured and recorded, as is well known.

Volume dependent calibration curves

As heretofore stated, when dealing with external standards, the most conventional practice utilized in determining true activity levels of samples involves the use of calibration curves which are prepared in advance, there being a set of curves prepared for each different isotope of interest with each set including a separate calibration curve for each different volume that may be encountered. Referring to FIG. 5, a typical set of such curves has been illustrated, the curves here having been prepared for tritium $^3H$, a typical beta emitting isotope. Those skilled in the art will appreciate as the ensuing description proceeds that a smilar set of calibration curves can be prepared for other isotopes that may be of interest such, for example, as Carbon-14. In order to facilitate an understanding of the present invention, a brief description has been set forth herein below with regard to the preparation and use of such calibration curves.

(a) *Preparation of curves.*—It will be observed upon inspection of FIG. 5 that four calibration curves are there illustrated—viz., curve 94 which is representative of the calibration curve for tritium where the sample vial contains approximately 5.25 ml. of liquid; the curve 95 which has here been prepared for a sample volume of approximately 10.5 ml.; the curve 96 which has here been prepared for a sample volume of approximately 15.75 ml.; and the curve 97 which has here been prepared for a sample volume of approximately 21 ml. It will be observed also that "net external standard ratio" forms the parameter of the abscissa of the curves, while the percentage of tritium efficiency forms the parameter of the ordinate of the curves.

In order to prepare a set of calibration curves such as depicted in FIG. 5, the technician will normally prepare a series of samples of known activity for each different isotope that may be of interest. In the exemplary case where the isotope of interest is tritium, the technician might, for example, prepare a series of ten samples each of which includes the same amount of tritium activity (e.g., each of the ten samples might include 100,000 d.p.m. of tritium activity). Next the technician will add to each of the samples precisely the same amount of liquid scintillator medium, for example, 15.75 ml. of liquid scintillator medium per sample vial. The technican then adds varying quantities of a suitable quench material to different ones of the ten samples. For example, the first sample in the series of ten will usually be the "unquenched sample" and, consequently, no quench material is added to that sample. The second sample in the series will have a small amount of quench material added—perhaps on the order of approximately fifteen microliters of quench material. The third sample will have a greater quantity of quench material such, for example as approximately thirty microliters, while each succeeding sample in the series will have successively greater quantities of quench material inserted therein. The net result of this advance preparation is the formation of a series of ten differently quenched samples each of which has approximately the same volume and each of which possesses the same activity.

Once the series of differently quenched samples has been prepared in the manner described above, the technician will then successively insert each sample in the series in to the apparatus 20 (FIGS. 1 and 2) where the activity level of the sample is measured. Referring next to FIG. 3, let it be assumed that the apparatus there depicted has been adjusted so as to permit counting of the isotope undergoing test (here tritium) in channel I while channels II and III are preset so as to permit counting of an extennal standard (i.e., emissions emanating from the standard 48 as shown in FIG. 5). This may be accomplished, for example, merely by selectively adjusting the amplifiers 80, 80' and 80" in a manner well known to those skilled in the art while simultaneously adjusting the gates 79, 79' and 79" to permit passage of selected amplitude bands of pulses. Thus, the gate 79 would be adjusted to permit passage of those pulses emanating primarily from the tritium isotope and which fall within a selected amplitude band; the gate 79' might similarly be adjusted to permit passage of a selected band of relatively low energy emissions emanating primarily from the standard source 48; and the gate 79" might similarly be adjusted to permit passage of a selected band of relatively high energy emissions emanating primarily from the standard source 48. Of course, those skilled in the art will appreciate that the channels which are to be used only for recording counts resulting from the external standard (i.e., channels II and III) do not need to employ adjustable gates or adjustable amplifiers, nor do they require printers. Quite to the contrary, such channels could be preset at the factory (although capable of internal screw driver adjustments by qualified technicians) and the counts recorded on the scalers could be electronically converted into a numerical ratio reading which is presented visually on the front panel of the apparatus so that the technician reads directly the ratio of the counts in channel II to the counts in channel III.

With the apparatus 20 and programming logic 70 adjusted in the foregoing manner, the technician may first insert the unquenched sample into the detection chamber of the apparatus and initiate a counting cycle for a predetermined time interval—say, one minute. Thus, during that one-minute period, a certain number of counts will be recorded in channel I which are, under the illustrative conditions, representative of counts emanating from the tritium isotope which, in this instance, has a known activity level of 100,000 d.p.m. Let it be assumed further that the scaler 81 and printer 86 reflect a recorded count of 45,000 counts during the one-minute counting period. The technician then knows that for that particular sample he has counted with an efficiency of forty-five percent. Having completed the count, the technician may then shift a standard source 48 (FIG. 4) into proximity with the sample vial then disposed in the detection chamber, for example, by means of the apparatus shown in FIG. 2. Let it be assumed that the source 48 comprises ten μc. of radium (Ra–226). The count cycle is then repeated for a second one-minute period producing an accumulation of counts in both the scalers 81' and 81" associated with channel II and channel III, thus permitting determination of the ratio of counts in channel II and channel III. Let it further be assumed that the ratio of counts in channel II and III is arbitrarily set at 1.0 for an unquenched sample. Under these conditions, the operator is now able to plot the first point required to form the curve 96 which is here representative of a sample volume of 15.75 since the operator has now determined the efficiency (forty-five percent) and the external standard ratio (1.0) of the unquenched sample.

The foregoing procedure is then repeated for the second sample in the series which in this instance contains approximately 15 microliters of quench material. It will be found that since the second sample is quenched slightly, the counting efficiency recorded in channel I will be somewhat less than the counting efficiency determined for the first unquenched sample, and in the illustrative instance the second sample may show a counting efficiency of on the order of thirty-five percent. Similarly, during the second counting period for the second sample when the sample is exposed to radiations emanating from an external standard source 48, it will be found that the ratio of counts recorded in channels II and III will drop slightly—for example, to approximately .82. Thus, the efficiency of the thirty-five percent and the ratio of .82 determine a second point on the 15.75 ml. calibration curve. The foregoing procedure is then repeated for each of the remaining eight samples that were prepared and the information recorded during the two counting periods for each of the samples is then entered onto the graph shown in FIG. 5. When all ten samples have been counted, the curve 96 may be drawn in.

Once the technician has prepared the curve 96, he must then prepare similar curves such as the curves 94, 95 and 97 for each of the remaining volumes that he anticipates may be encountered. To do this, it is necessary that he prepare three more complete sets of differently quenched samples with each set containing samples of known volume, known activity, and known quenching. Thus, it will be observed that in order to prepare the four calibration curves shown in FIG. 5 in the manner described above, it is necessary for the technician to prepare a total of forty samples, ten of which contain 5.25 ml. of liquid, ten of which contain 10.5 ml. of liquid, ten of which contain 15.75 ml. of liquid and ten of which contain 21 ml. of liquid. Each of the forty samples must then be counted twice, once when exposed to an external standard source and once when shielded from an external standard source, thus necessitating a total of eighty one-minute counting periods plus the attendant time required to change samples. Finally, the information recorded during the eighty counting periods must be transferred to the graph in order to permit formation of the calibration curves.

Of course, those skilled in the art will appreciate that it is immaterial whether the samples are first counted when exposed to the standard source 48 or, alternatively, first counted when shielded from the external source, and either procedure is acceptable.

(b) Use of calibration curves.—Once a set of calibration curves has been prepared, an understanding of their actual use in practice is relatively simple. However, as will become apparent below, great care must be exercised by the technician when using the curves so as to be sure that he is aware of the volume of each sample since an error in volume will result in a significant error in the determination of the counting efficiency for that sample.

Thus, let it be assumed that the technician in the field wishes to determine the true activity level of a sample containing an unknown amount of activity but which is known to contain an isotope of tritium. Normally, the technician will insert the sample into the detection chamber of the counting apparatus (FIG. 2) for a predetermined period of time—for example, three minutes. The sample is then counted and at the end of the three-minute period the number of counts accumulated on the scaler 81 are printed out on the printer 86. Let it be assumed that the count "read out" on the printer 86 is 10,000. The technician is, however, unable to determine from the "read out" of 10,000 counts the true activity level of of the isotope since he does not at this point know the counting efficiency. To determine the counting efficiency, the technician then counts the sample for a second counting period of say, one minute, during which counting period the external standard 48 is shifted into position beside the vial. The technician then notes the ratio of counts in channels II and III, and, let it be assumed that such ratio is .8. The technician may then refer to the calibration curves that were previously prepared and which are here shown in FIG. 5. However, it will be observed upon reference to FIG. 5 that with a determined external standard ratio of .8, the actual counting efficiencies for the tritium isotope may vary between thirty-two and forty percent. Thus, if the sample which resulted in a count of 10,000 in three minutes contained 5.25 ml., the counting efficiency would have been forty percent and the true activity level of such a sample could then be calculated by dividing the observed count of 10,000 counts per minute by the efficiency of forty percent and the resultant quotient by the time period of three minutes, thus indicating a true activity level for the isotope of 8,333 d.p.m. On the other hand, if the sample contained 21 ml. of liquid, the counting efficiency would only be thirty-two percent, in which event the true activity level of the sample would be found on computation to be 10,417 d.p.m. It can, therefore, be seen that the technician must exercise great care when determining the actual sample volume since the volume of liquid if imprecisely determined can create a significant error in the final calculations. Indeed, it can be seen that such errors may be on the order of, or even in excess of, twenty-five percent.

Various theories have heretofore been espoused for the reason why counting efficiency is dependent upon sample volume. One such theory has been based upon the belief that the relative position of the external standard with respect to the sample vial itself is the primary factor contributing to "volume dependence." However, I have found that the relative position of the external standard source with respect to the vial is, for all intents and purposes, a negligible factor in the problem of "volume dependence." Thus, experiments have shown that the calibration curves depicted in FIG. 5 are also applicable if a single external standard source 48 comprising ten μc. of Ra-226 is positioned adjacent the upper edge of the sample 24 (as shown in FIG. 6), as well as if such a standard source 48 is positioned immediately below the sample 24 and on the axis thereof (as shown in FIG. 6A). Moreover, the phenomenon of "volume dependence" has also been determined to exist when two identical external standard sources 48 are positioned at different points adjacent the sample 24. Thus, in FIG. 6B one such arrangement is depicted in which a standard source 48 is positioned adjacent the lower edge of the sample 24 and an identical source 48 is positioned adjacent the upper edge of the sample 24 but on the opposite side thereof. Similarly, in FIG. 6C, there is depicted an arrangement in which two identical external standard sources 48 are positioned respectively adjacent the upper and lower edges of a sample 24 but on the same side thereof. In both instances (that shown in FIG. 6B and that shown in FIG. 6C) it has been found that the calibration curves are dependent upon the volume of liquid medium in the sample vial.

Volume independent external standardization according to the present invention

Thus far, the environment of the invention has been described in connection with procedures for determining the true activity levels of test samples wherein the corrective computations that must be performed are significantly effected by the volume of liquid in the sample undergoing test. Therefore, it has been necessary with such conventional systems to prepare in advance calibration curves not only for each isotope of interest, but also for each sample volume that may be encountered. Moreover, it has been necessary for the technician to ascertain the volume of liquid contained in each sample being analyzed in order that the true counting efficiency for that sample can be determined from the calibration curves. However, the present invention is concerned with procedures for determining the true activity levels of such samples wherein differences in sample volume do not affect counting efficiencies or wherein the effect, if any, is so negligible as to be reasonably disregarded without harmfully affecting the accuracy of the test results.

I have found that the phenomenon of "volume dependence" appears to result from the fact that when dealing with external standards which characteristically emit both high and low energy radiations (for example, Ra-226), the chances of observing multiple "Compton interactions" from a single disintegration are considerably greater with increasing sample volumes where the initial disintegration comprises a relatively high energy emission rather than a relatively low energy emission. Stated another way, and with reference to FIG. 4, assuming that the sample 24 contains 5.25 ml. of liquid, it would appear that the probabilities of having a second "Compton interaction" from a given disintegration are relatively low regardless of whether the particular emission is of high or low energy. However, if the volume of liquid in the sample 24 is 10.5 ml., the chances of observing a second "Compton interaction" are significantly increased but the chances of observing such a second interaction increase at a much faster rate for high energy emissions than for low energy emissions as a consequence of known physical laws. Similarly, as the volume of liquid in the sample is increased to 15.75 ml. and then to 21 ml. the effect is to rapidly increase the chances of multiple "Compton interactions" for high energy emissions while the increase in multiple "Compton interactions" from low energy emissions is negligible. It will be appreciated from the foregoing that the ratio of high to low energy emissions, the parameter plotted on the abscissa of the calibration curves shown in FIG. 5, will change with changes in sample volume, thus resulting in the "volume dependence" phenomenon.

In accordance with the present invention, provision is made for maintaining the increased rate of multiple "Compton interactions" with increases in sample volume substantially the same for both high energy and low energy emissions, thus insuring that the ratio of observed high and low energy scintillations remain substantially constant with changes in sample volume. To this end, I have found that if a second external standard source, which characteristically emits primarily low energy emissions only, is positioned adjacent the sample 24 but spaced vertically from the source 48 which emits both high and low energy radiations, then the second source will serve to contribute an increasingly greater number of low energy light scintillations with increases in sample volume, thereby tending to maintain the ratio of low energy and high even though the sample volume increases. Thus, directing energy "Compton interactions" substantially constant even though the sample volume increases. Thus, directing particular attention to FIG. 7, it will be observed that in this instance an external standard source 48 which characteristically emits penetrating radiations having both relatively high and relatively low energies is positioned adjacent the lower edge of the sample 24. In actual experiments, the source 48 comprised 10μc. of Ra226. Similarly, a second external standard source 98, which characteristically emits penetrating radiations having primarily relatively low energies only, is positioned adjacent the upper edge of the sample 24 and on the same side of the sample as is the more energetic source 48. In actual experiments, two different low energy emitters were actually used. In one instance, the low energy source 98 comprised approximately 65μc. of americium (Am-241) while in the other instance the low energy source 98 comprised 10 μc. of barium (Ba-133). Those skilled in the art will appreciate that other high energy sources could be used for the source 48 other than Ra-226, for example, suitable isotopes of cobalt might be used. Similarly, other low energy sources than the experimental barium and americium sources could be employed. However, I have found that excellent results are achieved where the relatively high energy external standard 48 is Ra-226 and the relatively low energy external standard 98 is Am-241 since both of these materials have extremely long half-lives, thus insuring that their activity levels remain stable over extended periods of use. Obviously, where standards having relatively short half-lives are used, their activity level will change significantly over a given period of time and under these conditions it may be necessary to prepare new calibration curves periodically to account for the changed activity levels of the standards being used. However, when dealing with Ra-226 and Am-241, the activity levels of the standards will remain stable during the useful life of the equipment, thereby eliminating the need for recomputing the calibration curves on a periodic basis.

Turning next to FIG. 8, there is illustrated a set of calibration curves which have been prepared in precisely the same manner as were the calibration curves shown in FIG. 5. Again, the isotope of interest is tritium and the calibration curves were prepared on the basis of a first series of samples containing 5.25 ml. of liquid, a second series of samples containing 10.5 ml. of liquid, a third series of samples containing 15.75 ml. of liquid and a fourth series of samples containing 21 ml. of liquid. All of the samples in each series contained a known amount of activity and the samples in each series were differentially quenched by adding known amounts of quench material thereto. Each sample was then counted twice, once without being exposed to any external standard source so as to ascertain the counting efficiency and once when exposed to the composite array of sources 48, 98 as shown in FIG. 7 so as to determine net external standard ratio. It was found when the readings recorded from the foregoing counting cycles were entered upon the graph, the points which defined the calibration curves for the samples containing 10.5 ml., 15.75 ml. and 21 ml. all fell on or substantially on a common calibration curve which is designated in FIG. 8 at 99. Stated another way, it was observed, as can be noted from FIG. 8, that the same calibration curve 99 was equally applicable for all sample volumes falling generally within the range of approximately 7.5 ml. of approximately 22.5 ml. However, it was also noted that the calibration curve representative of sample volumes on the order of 5 ml. did differ slightly from the curve 99, and the 5 ml. curve is designated in FIG. 8 at 100.

Those skilled in the art will appreciate from the foregoing description and upon reference to FIGS. 7 and 8 conjointly, that there has been provided a considerably simplified procedure not only for the establishment of calibration curves, but also for the use of such curves in the field. Thus, where employing two external standards, one of which characteristically emits only low energy radiations and the other of which characteristically emits both high and low energy radiations, and where the standards are positioned as shown in FIG. 7, the work involved and the time required to prepare the calibration curves is halved. Thus, under this exemplary set of conditions it is only necessary to prepare two series of differentially quenched samples, one series containing samples having 5.25 ml. volumes and the other series containing samples having volumes falling generally within the range of 10.5 to 21 ml. since the curve 99 produced by the second series will be equally applicable to any test samples containing liquid volumes falling within the region of 7.5 to 22.5 ml. Moreover in use additional savings in time and accuracy are effected since the technician can proceed with full knowledge that the readings recorded on the printers are substantially "volume independent" so long as the sample volume is greater than approximately 7.5 ml.

I have also discovered that while the vertical spacing of the two external standards does affect the calibration curves produced in a manner to be described below, the circumferential positioning of the standards is immaterial. Thus, I have found that the two standards 48, 98, may be positioned on the same side of the sample 24 as shown in FIG. 7 or, alternatively, they may be positioned on opposite sides of the sample 24 as shown in FIG. 7A. Indeed, they might also be positioned at other angular and radial relationships with respect to the axis of the sample. In each instance, however, where the two standards 48, 98 are spaced vertically apart in the manner depicted in FIGS. 7 and 7A, the calibration curves 99, 100 shown in FIG. 8 are applicable.

As indicated above, it has been found in the practice of the present invention that changes in the relative vertical positions or spacing of the external standards 48, 98 with respect to one another does affect the calibration curves which are prepared. However, such change has not been found to affect the fact that the use of two different external standards having the energy characteristics previously described for the standards 48, 98 does create a workable and practical range of "volume independence" of approximately 15 ml. Thus, in accordance with another feature of the present invention it has been found that if the external standard 98 is positioned adjacent the sample 24 but at about the midpoint of the vial as shown in FIG. 9, the effect is to create a range of "volume independence" from approximately 2.5 ml. to approximately 17.5 ml., and the calibration curve represented by such a "volume independent" range is depicted at 101 in FIG. 10. However, in this instance it is found that there is a small degree of "volume dependence" when dealing with samples containing on the order of 21 ml., and the calibration curve for such samples is depicted at 102 in FIG. 10. Again, it will be appreciated by those skilled in the art that if the technician anticipates dealing with samples which are not expected to have sample volumes in excess of 17.5 ml., he can proceed with external standards 48, 98 positioned as shown in FIG. 9, in which event changes in volume from sample to sample can be ignored and will not affect the accuracy of the test results provided that no sample contains more than approximately 17.5 ml. And, of course, even if the sample vial does contain more than 17.5 ml., the error that can result will be minimal when compared with the error that can result in completely "volume dependent" systems such as represented by the calibration curves of FIG. 5. Moreover, if the technician does note that a given sample contains more than 17.5 ml. of liquid—i.e., that the sample vial is substantially full—he need merely refer to the calibration curve 102 in order to determine the counting efficiency for that particular sample.

It will be appreciated from the foregoing that there has herein been described a highly reliable procedure for determining true activity levels of test samples wherein the effects of "volume dependence" are substantially eliminated. In its broadest aspects, the procedures set forth are applicable to a wide range of liquid scintillation counting systems embracing completely manual systems, semi-automatic systems and fully automatic systems. Thus, in a completely manual system it is possible to insert the standards 48, 98 (FIGS. 7, 7A and 9) into the detection apparatus adjacent the counting chamber manually in any of the two ways commonly employed heretofore in the art. Alternatively, the two standards may be mounted on one or more manually shiftable supports which can be moved to shift the standards into the desired positions shown in FIGS. 7, 7A and 9 or from such positions back into a shielded portion of the detector apparatus. On the other hand, the two standards 48, 98 may be automatically shifted between first positions operatively associated with the sample in the detection chamber and second positions remote from the detection chamber. Those interested in specific details of the control circuitry and various types of apparatus that might be employed in a completely automatic system of this type are referred to the aforesaid Packard U.S. Patent No. 3,188,468. However, since that patent dealt only with the positioning of a single standard source, there is briefly described hereinbelow an exemplary system quite similar to the apparatus shown in FIG. 2 for automatically positioning two external standards 48, 98 in either the relative positions shown in FIGS. 7 or 9.

In carrying out this aspect of the invention, and as best illustrated by reference to FIGS. 11 and 12 conjointly, it will be observed that the elevator 29 carrying a sample 24 on its platform 30 is here shown in the "sample loaded" or elevator down position with the sample 24 positioned between the photomultipliers (not shown). A conduit 104, which is quite similar to the conduit 55 previously described in conjunction with the description of the apparatus shown in FIG. 2, is provided which projects upwardly into the sidewall 64 (FIG. 11) and downwardly into the shielded housing 58. In this instance, the conduit 104 houses external standards 48 and 98 and serves to permit pneumatic transfer thereof between a first position in operative association with the counting chamber (as shown in FIG. 11) and a second position remote from the detection chamber and within the shielded housing 58 (as shown in FIG. 12). Of course, since the standard 98 emits radiations of only relatively low energy, it has been found that it is not necessary for such standard to be positioned within the shielded housing 58 and it will suffice to merely insure that the higher energy external standard 48 is disposed within the shielded housing 58 when not in use. As illustrated in FIG. 11, the upper end of the conduit 104 terminates in a fixed stop 105 while the lower end of the conduit 104 is provided with an annular stop 59 disposed within the housing 58. A conduit 106 communicates with the upper end of conduit 104 for the purpose of venting fluid pressure to atmosphere.

For the purpose of selectively shifting the external standards 48, 98 between their two limit positions, the lower end of conduit 104 is coupled through a T-connection 108 to a pair of normally closed two-way control valves 109, 110. In the illustrative apparatus shown in FIG. 12, control valve 109 is coupled to the high pressure side of a conventional fluid pump which may simply take the form of a pneumatic pump 111 by means of a high pressure conduit 112. Similarly, the control valve 110 is coupled to the low pressure or vacuum side of the pump 111 by means of a vacuum line 114. As is conventional, the pump 111 is provided with an air inlet 115. The arrangement is such that when the pump 111 is energized and the control valve 109 is open, the conduit 104 is subjected to high pressure, thus serving to blow or urge the standards 48, 98 upwardly through the conduit 104 until they engage the fixed stop 105. Conversely, when the pump 111 is energized and the control valve 110 is open, the conduit 104 is coupled to the vacuum side of the pump and the standards 48, 98 are sucked downwardly through the conduit 104 until the lower standard 48 engages the annular stop 59.

While it will be understood by those skilled in the art that the radioactive external standard pellets 48, 98 may take various forms and have any of a number of diverse shapes and dimensions, as well as being formed of different isotopes, it has been found that when such pellets are employed in a fluid-actuated delivery system of the types shown in FIGS. 2 and 12, excellent results are achieved when each pellet has a generally "dumbbell" shaped configuration. Referring to FIG. 13, there is illustrated in enlarged vertical section a typical pellet, generally indicated at 48 which has been found to be particularly satisfactory in the exemplary systems shown in FIGS. 2 and 12. As there illustrated, the pellet 48 comprises a generally cylindrical outer casing or sheath 116 which, in accordance with the present invention, is preferably made of Monel metal Alloy #400. The reasons for the preference for this particular alloy will become more apparent as the ensuing description proceeds. Totally encapsulated within the outer sheath 116 is a second hollow sheath 118, the sheath 118 preferably being formed of platinum and serving to house a known amount of radioactivity—e.g., 10 $\mu$c. of Ra–226. For the purpose of minimizing frictional contact between the standard 48 and the walls of the conduit 104 and thus enhancing the sliding characteristics of the standard, as well as for the purpose of facilitating movement of the standard around any bends that might appear in the conduit 104, a pair of generally spherical nylon balls 119 are provided, each ball being provided with a bore 120 dimensioned to snugly receive one extremity of the outer sheath 116. The balls 119 are then mounted on the opposite ends of the outer sheath 116 and rigidly secured in place by means of a suitable epoxy cement as indicated at 121.

Referring next to FIGS. 11 and 14 conjointly, it will be observed that the uppermost external standard 98, which in this exemplary instance comprises the emitter of only low energy penetrating radiations such as a source of americium or barium, is identical in physical appearance to the standard 48 and differs therefrom only in the type of emitter that is encapsulated within the platinum sheath 118.

In carrying out one of the important features of the invention, provision is made for maintaining the pellets 48, 98 in fixed vertically spaced apart relation with respect to one another when positioned with in the conduit 104, while at the same time permitting selective adjustment of the extent of vertical spacing therebetween so as to permit positioning of the two pellets in either the manner shown in FIG. 7, the manner shown in FIG. 9 or other modifications thereof. To this end, and as best illustrated in FIGS. 11 and 14, a series of dummy pellets, generally indicated at 122, are provided, the dummy pellets being identical in external appearance to the radioactive standards 48, 98. Thus, each of the dummy pellets 122 has a "dumbbell" like configuration and is provided with a pair of nylon balls 119 at its opposite ends. However, in this instance, the nylon balls are mounted on and spaced apart by short bars 124 of rod stock which may take the form of any suitable inert plastic or metal material. Thus, if the technician wishes to position the external standards 48, 98 in the relative positions indicated with respect to the vial 24 as shown in FIGS. 7 and 11 for example, it is merely necessary to interpose a desired number of dummy pellets 122 between the two standards 48, 98 when they are mounted within the conduit 104 and, in the illustrative arrangement, four such dummy pellets 122 serve to effect the desired vertical spacing. On the other hand, should the technician wish to position the two pellets 48, 98 in the approximate relative positions shown by way of example in FIG. 9, it would merely be necessary to remove two of the dummy pellets 122. And, of course, it would be possible to remove any number of the four dummy pellets 122, or indeed all of the pellets 122, to meet any specific requirements of the technician. Similarly, if desired, more than four dummies could be interposed between the two standards. In certain specific instances the technician might find it desirable to provide means for insuring that the lower and more energetic standard 48 was raised slightly above the lower edge of the vial 24 when in the operative position shown in FIG. 11. Under these conditions, it would merely be necessary to interchange the relative positions of the standard 48 and the dummy pellet 122 which is shown immediately above the standard 48, thus producing an arrangement in which there would be one dummy pellet 122, an external standard 48, one or more additional dummy pellets 122 and an external standard 98 as viewed from bottom to top in FIGS. 11 and 14.

Referring next to FIGS. 15 and 16, there have been illustrated two modified spacing arrangements for supporting two different external standards in vertically spaced apart relation and which also embody the features of the present invention. Thus, as shown in FIG. 15, the lower standard 48 and the upper standard 98 are spaced apart by a "barbell" shaped spacer 125. In this instance, the spacer 125 comprises an elongate rod 126 which may be of any desired length to secure a specified degree of vertical spacing between the standards, the rod 126 being formed of any desired metal or plastic bar stock. Again, the opposite ends of the rod 126 support a pair of nylon balls 119 which facilitate sliding movement of the assemblage through the conduit 104. Of course, where the rod 126 is formed of rigid material, it would be necessary to provide a conduit 104 (FIG. 11) which was void of bends. However, since the straight line path defined by the conduit 104 does not intersect the detection chamber but merely passes adjacent the detection chamber, there would not be a straight line path between the standard 48 when in its inoperative position and the sample vial 24 disposed in the detection chamber. Consequently, no significant amount of radiation emanating from the standard 48 would reach the sample 24 during a non-standardization count. If desired, the rod 126 could be formed of a suitable shield material so as to further inihibit radiations from reaching the detection chamber when the standard 48 is withdrawn.

The modified external standard arrangement depicted in FIG. 16 is quite similar to that shown in FIG. 15. However, in this instance, the platinum encapsulated sources 118 which define the lower and upper external standards respectively, generally indicated at 48 and 98, are mounted directly in the opposite ends of an elongate rod 128 which may be of any desired length and which may be formed of any desired metal or plastic material. The opposite extremities of the rod 128 are then inserted into the nylon balls 119 which are rigidly secured in place. Thus, the external standard arrangement for use in accordance with the modification of the invention shown in FIG. 16 comprises a single "barbell" device having an external standard at its lower end which characteristically emits both high and low energy penetrating radiations and an external standard at its upper end which characteristically emits only low energy pentrating radiations.

In order to facilitate an understanding of how the present invention might be practiced in a completely automatic system, reference is here made to FIGS. 11 and 12 conjointly. It should be kept in mind that in a completely automatic system, each sample 24 that is conveyed into the detection chamber is preferably counted twice before it is removed, at least one count being made when the two external standards 48, 98 are in operative association with the sample as shown in FIG. 11 and at least one count being made when the external standards 48, 98 are disoperatively associated with the sample as shown in FIG. 12. As stated above, it is immaterial which counting cycle is performed first, but for purposes of the present description, the operational cycle described below will be based upon a first counting period when the standards are disoperatively associated with the sample and a second counting period when the standards are operatively associated with the sample. Moreover, it will be recalled that in the description of FIG. 3 it was pointed out that when the sample 24 reaches the "sample loaded" or elevator down position (as shown in FIG. 11) a signal is applied on the "sample loaded" terminal 71, such signal being derived from closure of the "stop" contacts of the lower limit switch LS1. The signal that is thus applied to the terminal 71 (FIGS. 3 and 12) is then effective to instruct the counting logic 70 to initiate a first counting cycle and, under the assumptions made above, the first counting cycle will here be made with the external standards 48, 98 disoperatively associated from the sample 24 in the detection chamber and with the standards in the position depicted in FIG. 12.

Let it first be assumed that the technician wishes to count successive samples 24 without employing standardization counting procedures. In this event, and as illustrated in FIG. 12, an operator controlled mode selector switch 129 is positioned in the automatic standardization "off" position. Thus, when the first counting cycle for the sample is complete, a control signal is presented on the "change sample" terminal 92 in the manner previously described. That signal is then routed directly to an elevator unload terminal 130, it being understood that in a completely automatic system the elevator unload terminal 130 would be coupled to the unload terminal of the elevator motor M1 (FIG. 3) through the "run" contacts of the upper limit switch LS2 and the operator controlled mode selector switch 46 would not be used. Thus, the signal applied on the elevator unload terminal 130 is effective to energize the elevator motor M1 and the sample 24 is ejected from the detection chamber.

Let it now be assumed that the technician desires to count successive samples with automatic standardization thereof in accordance with the present invention. In this event, the selector switch 129 (FIG. 12) is turned to the "on" position so that when the count for the first sample has been recorded by the printer 86 (FIG. 3) the signal presented on the "change sample" terminal 92 (FIGS. 3 and 12) of the counting logic 70 is now passed to the automatic standardization "on" terminal 131 (FIG. 12).

In keeping with this aspect of the present invention, provision is made for passing alternate signals presented at the "on" terminal 131 first to the "sample loaded" terminal 71 of the counting logic 70 so as to initiate a second counting cycle for the sample in the detection chamber, and second, to the "elevator unload" terminal 130 which provides the necessary input to effect an ejection cycle for the elevator 29, thus insuring that each sample is ejected from the detection chamber only after the sample has been counted twice. To this end, the first signal presented on the "on" terminal 131 is applied to the junction of a bistable flip-flop 132 to cause the latter to switch from its "reset" to its "set" condition.

Since flip-flops of the bistable and monostable variety are well known to those skilled in the art, they will not be described herein in detail. Rather, the flip-flops have been illustrated symbolically as having a "set" section S and a "reset" section R with a junction therebetween. It will be understood that when a signal is presented at the junction of a bistable flip-flop, the latter will shift from one state to the other. Similarly, when an input signal or pulse is applied to the S section of a monostable flip-flop, the latter will be momentarily "set," thus producing a predetermined output signal from the S section. After a time delay dependent upon the characteristics of the monostable flip-flop, the latter will automatically return to its "reset" state.

Keeping the foregoing characteristics of conventional flip-flops in mind, it will be appreciated that the first signal presented on the terminal 131 will drive the flip-flop 132 to its "set" state, thus producing an output signal which is passed directly to the "sample loaded" terminal 71 through a time delay device 134 for the purpose of initiating a second count cycle for the sample 24. At the same time that the signal presented on the "on" terminal 131 is conveyed to the flip-flop 132, it is simultaneously applied to the "set" section S of a monostable flip-flop 135, thereby causing the latter to switch momentarily to its "set" state and completing a momentary energizing circuit for a solenoid S2 through a time delay device 136 and the normally closed contacts R1$_a$ controlled by a relay R1. Momentary energization of the solenoid S2 is effective to shift the high pressure control valve 109 from its normally closed state to an open state, thus coupling the high pressure conduit 112 directly to the conduit 104. At the same time, momentary setting of the monostable flip-flop 135 serves to complete a momentary enerigizing circuit for the pump 111, thus turning the latter on and pressurizing the conduit 104 to shift the standards 48, 98 from the position shown in FIG. 12 to the position shown in FIG. 11. In the illustrative arrangement, the delay characteristics of the time delay devices 134, 136 are such that the pump 111 is energized and the control valve 109 opened before a signal is applied to the terminal 71, which signal serves to instruct the counting logic 70 to initiate a second counting cycle, such counting cycle being conducted with the external standards 48, 98 in the position shown in FIG. 11.

It will be recalled that in the description of the conventional apparatus shown in FIG. 2, provision was made for maintaining the conduit 55 pressurized during the second counting cycle for the sample and, consequently, the pump 68 was continuously operating. However, in the present system as depicted in FIGS. 11 and 12, the pump 111 and control valve 109 are only actuated for a momentary period the length of which is determined by the characteristics of the monostable flip-flop 135. Thus, when the conduit 104 is pressurized, the external standards 48, 98 and the intervening dummy pellets 122 are blown upwardly in the conduit 104 until the uppermost nylon ball 119 on the standard 98 abuts the fixed stop 105. When the flip-flop 135 returns to its "reset" state, the energizing circuits for the pump 111 and the solenoid S2 are broken, thus turning the pump off and closing the control valve 109. When this occurs, the "train" of external standards and intervening dummy pellets tend to drop back through the conduit 104 towards the annular stop 59 due to the effect of gravity.

In order to insure that the entire train of external standards 48, 98 and intervening dummy pellets 122 are maintained in operative association with the sample 24 in the detection chamber during the second "standardization" counting cycle for the sample, means are provided for affirmatively positioning the train the position shown in FIG. 11. To this end, an annular torroidal magnet 138 is mounted in the sidewall 64 (FIG. 11) with the inner peripheral wall of the magnet defining a portion of the wall of the conduit 104. In the illustrative arrangement, steel ball 139 is positioned in the conduit 104 immediately beneath the external standard 48, the steel ball being movable in the conduit under the effects of changes in fluid pressure along with the train of external standards 48, 98 and intervening dummy pellets 122. Thus, the arrangement is such that when the conduit 104 is pressurized and the external standard train and steel ball 139 are blown upwardly through the conduit, upward movement of the train and steel ball terminates when the latter is positioned at or slightly above the magnet 138. Consequently, when the pump is deenergized and the control valve 109 closed, the steel ball 139 and external standard train tend to move downward only until the steel ball 139 is centered within the magnet 138, at which time further downward movement is prevented by virtue of magnetic attraction between the magnet and the steel ball. Thus, the entire external standard train consisting of the external standards 48, 98 and the intervening dummy pellets 122 is precisely positioned adjacent the detection chamber during the "standardization" counting cycle for the sample 24. As previously indicated, the external sheath 116 (FIG. 13) of the external standard 48 is preferably made of Monel metal Alloy #400. The reason for the preference for this particular alloy is that such alloy has been found to also possess excellent characteristics of magnetic attraction. Consequently, if desired, the steel ball 139 could be eliminated, in which event the magnet would serve to magnetically attract the lowermost standard 48 and center the latter in a stationary position, thereby fixing the entire external standard train adjacent the detection chamber. Similarly, where it is anticipated that a steel ball will not be used, the connecting rods of the dummy pellets 122 could also be formed of a magnetically attractable material. Similarly, a slug of magnetically attractable material could be mounted on a portion of the elongated rods depicted in FIGS. 16 and 16A for purposes of positioning the composite external standard arrangements there illustrated.

After the sample 24 has been counted a second time and the data accumulated in the scales 81', 81" (FIG. 3) has been recorded and the desired ratio derived therefrom, the counting logic 70 will again present another output signal at the "change sample" terminal 92 (FIGS. 3 and 12). Since the mode selector switch 129 is still in the automatic standardization "on" state, the signal presented on the terminal 92 will again be conveyed to the terminal 131 and thence to the junction of the bistable flip-flop 132. However, this time the signal will be effective to switch the flip-flop 132 to its "reset" state, thus passing a control signal from the "reset" section R directly to the "elevator unload" terminal 130 through an asymmetrically conductive device 140. The sample 24 will now be unloaded in the manner previously described.

For the purpose of returning the steel ball 139 and the external standard train 48, 122, 98 to the position shown in FIG. 12, the output signal from the "reset" section R of the bistable flip-flop 132 also serves to complete an energizing circuit for the relay R1, thus serving to open the normally closed contacts $R1_a$ and close the normally open contacts $R1_b$ controlled thereby. At the same time that the signal which was presented on the terminal 131 is applied to the bistable flip-flop 132 to switch the latter to its "reset" state, the signal on terminal 131 is simultaneously applied to the "set" section S of the monostable flip-flop 135, thus again switching the latter to its "set" state. The momentary output signal from the flip-flop 135 is then passed through the time delay device 136 which is here effective to retard the signal a sufficient length of time to permit opening of the contacts $R1_a$ and closure of the contacts $R1_b$. Thus, the momentary signal derived from the monostable flip-flop 135 is passed through the now closed normally open contacts $R1_b$ controlled by the relay and through the coil of a solenoid S3, thereby energizing the latter. Energization of the solenoid S3 serves to shift the normally closed vacuum control valve 110 to the open state, thus coupling the vacuum line 114 directly to the conduit 104 for a momentary period of time determined by the characteristics of the monostable flip-flop 135. At the same time, the signal derived from the flip-flop 135 is effective to again turn on the pump 111 for a momentary period, thus creating a vacuum in the conduit 104 which is sufficiently strong to overcome the magnetic attraction between the magnet 138 and the steel ball 139 (FIG. 11) and thereby insuring that the steel ball 139 and the external standard train 48, 122, 98 are sucked downwardly into the position shown in FIG. 12. As a consequence, the next sample 24 introduced into the detection chamber will first be counted in an environment free from radiations emanating from the external standards 48, 98. When the flip-flop 135 returns to its "reset" state, the pump 111 is again turned off and the control valve 110 recloses. The relay R1 will remain energized only until the next signal is applied on the terminal 131, which signal will be effective to again switch the flip-flop 132 to its "set" state and that signal will be derived upon completion of the first counting cycle for the next sample.

It will be appreciated from the foregoing that the features of the present invention are not only applicable to manual liquid scintillation counting systems and semi-automatic liquid scintillation counting systems, but also to liquid scintillation counting systems which are entirely automatic in operation. Thus, in a system of the type depicted in FIGS. 11 and 12, successive samples can be counted twice, once when exposed to radiations emanating from two different external standards and once when shielded from such radiations, yet wherein neither the sample nor either external standard 48, 98 need be touched or manually manipulated.

In accordance with yet another aspect of the present invention, provision is made for extending the approximate 15 ml. range of "volume independence" attained by the forms of the invention depicted diagrammatically in FIGS. 7, 7A and 9, and as reflected by the calibration curves of FIGS. 8 and 10. To this end, there is illustrated in FIG. 16A a modified arrangement of external standards which is quite similar to the arrangement previously described in conjunction with FIG. 16. However, in this form of the invention, the uppermost external standard, which characteristically emits penetrating radiations having only relatively low energies, is axially extended, the external standard here being generally designated at 141. It will be apparent to those skilled in the art that the external standard 141 may comprise a platinum encapsulated source 142 such as americium or barium which is substantially identical to the platinum encapsulated source 118 in FIG. 16 with the exception that the source 142 is longer. Indeed, the source 142 may be composed of two or more sources 118 placed end to end. Alternatively, two or more sources 118 could be utilized which are axially spaced apart by a desired distance (an arrangement not shown in the drawings for the sake of simplicity). In any event, the axially extended external standard 141 is here depicted as mounted in an elongate rod 144 which may be identical to the rod 128 shown in FIG. 16. Again, the extremities of the rod 144 are received within and rigidly secured to a pair of nylon balls 119 which serve to guide the external standard train through the conduit 104 (FIGS. 11 and 12) between the two desired limit positions.

It will be appreciated that when employing an external standard arrangement such as that depicted in FIG. 16A, the lowermost or more energetic external standard 48 would cooperate with the upper portion of the external standard 141 to produce a "volume independent" range similar to that depicted by the calibration curves shown in FIG. 8. However, the contribution of the lower portion of the uppermost external standard 141 would tend to extend the "volume independent" range downwardly into the lower regions of the vial so that, for all intents and purposes, "volume independence" would be achieved throughout substantially all practical sample volume situations that might be encountered. It will, of course, be understood that this particular aspect of the invention is not necessarily limited to the form depicted in FIG. 16A. Quite to the contrary, substantially the same result could be achieved by substituting for the uppermost dummy pellet 122 depicted in FIG. 14, a second external standard 98 and it is in this broader context that the phrase "axially extended source of penetrating radiations having relatively low energies" is used in the appended claims.

While the present invention has been described in connection with procedures and equipment employing specific quantitative numerical values, those skilled in the art will appreciate that such values have been given solely for purposes of facilitating an understanding of the present invention. That is, it will be apparent that the specific percentages of counting efficiencies and the corresponding calibration curves shown by way of example in FIGS. 8 and 10 may vary dependent upon any number of different variable parameters such as the particular isotopes selected and the radioactive strength of such isotopes. Similarly, the specific quantitative values given for net external standard ratios in FIGS. 8 and 10 may also be varied simply by use of any selected constant multiplication factor. And, of course, under specific counting conditions, it would be possible to use other than the exemplary quantities of radioactive material than were used in the experiments described herein.

I claim as my invention:
1. In a method for determining the true activity level of a sample including a liquid scintillator and at least one isotope of unknown activity and wherein the sample is subjected to penetrating radiations emanating from externally disposed standard source material during at least a portion of a counting cycle, the improvement wherein the results obtained are substantially independent of the volume of liquid contained within the sample, said improved method comprising the steps of:
 (a) positioning a first external standard adjacent the sample, which standard characteristically emits penetrating radiations having both relatively high and relatively low energies;
 (b) positioning a second external standard adjacent the sample, which standard characteristically emits penetrating radiations having primarily relatively low energies with the second standard being spaced from the first standard and at a different height relative to the sample than the first standard; and
 (c) counting the scintillations created in the sample by the composite effect of radiations emanating from the first and second standards.

2. The method as set forth in claim 1 further characterized in that said second standard is positioned above said first standard.

3. The method as set forth in claim 2 further characterized in that said first standard is positioned below a horizontal plane passing through the middle of the sample and said second standard is positioned above said plane.

4. The method as set forth in claim 2 further characterized in that said first standard is positioned below a horizontal plane passing through the middle of the sample and said second standard is positioned at said plane.

5. The method as set forth in claim 3 further characterized in that said second standard is positioned adjacent the top of said sample.

6. The method as set forth in claim 5 further characterized in that said first standard is positioned adjacent the bottom of said sample.

7. The method as set forth in claim 2 further characterized in that said first and second standards are positioned on the same side of said sample.

8. The method as set forth in claim 2 further characterized in that said first and second standards are positioned on different sides of said sample.

9. The method as set forth in claim 2 further characterized in that said first standard is positioned adjacent the bottom of the sample and said second standard is positioned adjacent the upper half of the sample, said first standard comprising on the order of 10 $\mu$c. of Ra–226 and said second standard comprising on the order of 65 $\mu$c. of americium, so as to produce a range of sample volume independence on the order of fifteen ml. of liquid.

10. The method as set forth in claim 9 further characterized in that said second standard is positioned adjacent the top of the sample so that said range extends from liquid volumes of about 7.5 ml. to liquid volumes of about 22.5 ml.

11. The method as set forth in claim 9 further characterized in that said second standard is positioned adjacent the midpoint of the sample so that said range extends from liquid volumes of about 2.5 ml. to liquid volumes of about 17.5 ml.

12. The method as set forth in claim 2 further characterized in that said second standard comprises an axially extended source of penetrating radiations having primarily relatively low energies only, and the range of volume independence exceeds 15 ml. of liquid.

13. The method as set forth in claim 12 further characterized in that said axially extended source comprises at least two sources having substantially the same energy characteristics.

14. The method as set forth in claim 2 further characterized in that said first standard is selected from the group including Ra–226 and cobalt.

15. The method as set forth in claim 2 further characterized in that said second standard is selected from the group including Am–241 and Ba–133.

16. The method as set forth in claim 14 further characterized in that said second standard is selected from the group including Am–241 and Ba–133.

17. The method as set forth in claim 2 further characterized in that said first standard is Ra–226 and said second standard is Am–241.

18. The method as set forth in claim 2 further characterized in that said first and second standards are manually positioned adjacent the sample.

19. The method as set forth in claim 2 further characterized in that said first standard is positioned adjacent the lower edge of said sample and said second standard is positioned adjacent said sample in the region of the upper half thereof.

20. The method as set forth in claim 2 further characterized in that said standards are positioned in vertically spaced alignment on the same side of the sample and are simultaneously shifted to said positions from a point remote from the sample.

21. The method of determining the true activity level of successive samples each having a radioactive isotope in a vial of liquid scintillator and wherein the volumes of liquid in successive vials may differ from sample to sample, comprising the steps of introducing the sample vials containing the radioactive isotope into a detection chamber one at a time in seriatim order, positioning first and second external standards at points remote from the detection chamber with the first standard being of the type that characteristically emits penetrating radiations having both high and low energies and with the second standard being of the type that characteristically emits penetrating radiations having primarily low energies only, counting light scintillations created within the liquid scintillator in each vial during two successive counting periods, recording as a first count those scintillations counted during the first of said counting periods and as a second count those scintillations counted during the second of said counting periods, automatically shifting both of said first and second standards from said remote points to points adjacent the sample disposed in said detection chamber as an incident to recordation of one of said first and second counts and automatically returning said first and second standards to said remote points as an incident to recordation of the other of said first and second counts, whereby during one of said first and second counting periods the scintillations counted are created primarily by decay events occurring in said isotope and during the other of said first and second counting periods the scintillations counted are created by the composite effect of decay events occurring in said isotope and decay events occurring in both of said first and second standards, comparing the data recorded during the other of said first and second counting periods with a known volume independent calibration curve for said isotope to determine counting efficiency, and computing the true activity level of said isotope by dividing the count recorded during said one of said first and second counting periods by the determined value of said counting efficiency.

22. The method as set forth in claim 21 further characterized in that when said first and second standards are shifted to said points adjacent the sample disposed in said detection chamber said second standard is disposed above and in vertical alignment with said first standard.

23. The method as set forth in claim 22 further characterized in that said standards are at all times disposed in a conduit and are simultaneously shifted from points within said conduit and remote from said detection chamber through said conduit to said points adjacent the sample then in said detection chamber.

24. The method as set forth in claim 25 further characterized in that during said other of said first and second counting periods data is counted in one analyizing channel which is primarily representative of a selected band of signals produced by relatively low energy decay events in both said first and second standards, and data is simultaneously counted in a second analyzing channel which is primarily representative of a selected band of signals produced by relatively high energy decay events in said first standard, and a ratio of the data counted in said first and second channels is then compared with said volume independent calibration curve to determine counting efficiency for said isotope.

25. The method as set forth in claim 22 further characterized in that said first standard is selected from the group including Ra–226 and cobalt.

26. The method as set forth in claim 22 further characterized in that said second standard is selected from the group including Am–241 and Ba–133.

27. For use in substantially volume independent external standardization counting procedures of the type employed with liquid scintillation counting systems, an external standard array comprising, in combination, at least two external standards, each of said standards having a dumbbell configuration, one of said standards being of the type that characteristically emit penetrating radiations having both high and low energies, the other of said standards being of the type that characteristically emit penetrating radiations having primarily low energies only, and spacing means for maintaining said standards in fixed positions relative to one another.

28. An external standard array as set forth in claim 27 further characterized in that said spacing means comprises at least one identically shaped inert dumbbell device.

29. An external standard array as set forth in claim 27 further characterized in that said spacing means comprises an inert elongate barbell shaped device.

30. An external standard array as set forth in claim 27 further characterized in that said other of said standards comprises an axially extended source of penetrating radiations having relatively low energies.

31. An external standard array as set forth in claim 30 further characterized in that said source comprises at least two separate dumbbell standards.

32. An external standard array as set forth in claim 33 further characterized in that said other of said standards comprises an axially extended source of penetrating radiations having relatively low energies.

33. For use in substantially volume independent external standardization counting procedures of the type employed with liquid scintillation counting systems, an external standard array comprising, in combination, an elongate rod formed of inert material, at least two external standards carried by said rod, one of said standards being of the type that characteristically emit penetrating radiations having both high and low energies and being mounted adjacent one extremity of said rod, the other of said standards being of the type that characteristically emit penetrating radiations having primarily low energies only and being mounted adjacent the other extremity of said rod, and spherical guides mounted on the opposite ends of said rod.

34. The method of preparing a calibration curve which is known to be volume independent over a selected range of sample volumes comprising the following steps:
(A) preparing a series of liquid samples by the following steps performed in any order:
(1) inserting into a plurality of sample vials the same known amounts of activity in the form of the isotope of interest;
(2) adding to at least certain of the vials known and different amounts of a quench material so as to differentially quench all of the samples by known amounts;
(3) adding to all of the vials a liquid scintillator medium while maintaining the volume of liquid in each vial only within the upper and lower limits of the selected range;
(B) subjecting each of the samples prepared to two separate counting periods during which the following operations are performed in any order:
(1) during one of said counting periods for each sample scintillations occurring in the sample which are created by the isotope added in step A1 are counted;
(2) prior to the other of said counting periods for each sample two external standards are positioned adjacent the sample in vertically spaced relation with the lowermost standard being of the type that characteristically emits penetrating radiations having both high and low energies and with the uppermost standard being of the type that characteristically emits penetrating radiations having primarily low energies only;

(3) during the other of said counting periods for each sample scintillations occurring in the sample which are created by "Compton interactions" are separately counted in both a low energy range and a high energy range;

(C) arithmetically computing counting efficiency for each sample based on the data counted in step B1;

(D) determining the ratio of high and low energy events counted in step B3;

(E) plotting the data determined from steps C and D on a graph having its abscissa scaled in units of the ratios determined in step D and its ordinate scaled in units of counting efficiencies as computed in step C; and (F) drawing one smooth curve through the points plotted in step E with said curve being substantially superimposed on or immediately adjacent to all of the points plotted in step E irrespective of the volume of the sample from which the data was procured.

References Cited

UNITED STATES PATENTS 2,884,535   4/1959   Swift.
3,188,468   6/1965   Packard _____ 250—71.5

RALPH G. NILSON, Primary Examiner
MORTON J. FROME, Assistant Examiner

U.S. Cl. X.R.
250—84, 106